(12) United States Patent
Yamaoka et al.

(10) Patent No.: US 12,381,737 B2
(45) Date of Patent: Aug. 5, 2025

(54) VERIFICATION METHOD AND INFORMATION PROCESSING APPARATUS

(71) Applicants: Fujitsu Limited, Kawasaki (JP); KEIO UNIVERSITY, Tokyo (JP)

(72) Inventors: Mebae Yamaoka, Kawasaki (JP); Takeru Fukuoka, Chuo (JP); Takuya Sakamoto, Kawasaki (JP); Shigeya Suzuki, Fujisawa (JP)

(73) Assignees: Fujitsu Limited, Kawasaki (JP); KEIO UNIVERSITY, Tokyo (JP)

( * ) Notice: Subject to any disclaimer, the term of this patent is extended or adjusted under 35 U.S.C. 154(b) by 209 days.

(21) Appl. No.: 18/077,456

(22) Filed: Dec. 8, 2022

(65) Prior Publication Data

US 2023/0269095 A1  Aug. 24, 2023

(30) Foreign Application Priority Data

Feb. 21, 2022 (JP) ................................. 2022-024927

(51) Int. Cl.
*H04L 9/32* (2006.01)
(52) U.S. Cl.
CPC .................................. *H04L 9/3247* (2013.01)
(58) Field of Classification Search
None
See application file for complete search history.

(56) References Cited

U.S. PATENT DOCUMENTS

| 9,660,978 | B1 | 5/2017 | Truskovsky et al. |
| 2007/0016789 | A1* | 1/2007 | Wiersma ............... H04L 9/3247 |
| | | | 713/176 |
| 2014/0282871 | A1* | 9/2014 | Rowland ................ G06F 21/60 |
| | | | 726/3 |

(Continued)

FOREIGN PATENT DOCUMENTS

| CN | 113395281 A | 9/2021 |
| CN | 113806699 A | 12/2021 |

(Continued)

OTHER PUBLICATIONS

Extended European Search Report dated Jul. 18, 2023, issued in counterpart EP application No. 22210957.1. (8 pages).

*Primary Examiner* — Raqiul A Choudhury
(74) *Attorney, Agent, or Firm* — WHDA, LLP

(57) ABSTRACT

An information processing apparatus acquires a first verifiable credential (VC) that proves the validity of attribute information of a holder by a first signature verifiable by verification procedures of a first decentralized identifiers (DID) infrastructure and a second VC that proves the validity of the attribute information of the holder by a second signature verifiable by verification procedures of a second DID infrastructure. Next, the information processing apparatus verifies the second signature contained in the second VC by the verification procedures of the second DID infrastructure. Further, the information processing apparatus transmits a verification request for verifying the first signature contained in the first VC to a verification device capable (Continued)

of verifying the first signature contained in the first VC by the verification procedures of the first DID infrastructure, and then acquires, from the verification device, verification results of the first signature contained in the first VC.

8 Claims, 28 Drawing Sheets

(56) References Cited

U.S. PATENT DOCUMENTS

| | | | | |
|---|---|---|---|---|
| 2018/0232515 | A1* | 8/2018 | Guo | G06F 21/41 |
| 2021/0218574 | A1* | 7/2021 | Mao | H04L 63/04 |
| 2021/0256505 | A1* | 8/2021 | Peng | H04L 9/0894 |
| 2024/0022908 | A1* | 1/2024 | Baskaran | H04W 12/069 |

FOREIGN PATENT DOCUMENTS

| | | |
|---|---|---|
| JP | 2018-11203 A | 1/2018 |
| JP | 2020-10396 A | 1/2020 |

* cited by examiner

VERIFIER LIST (VERIFIERS OF 1ST DID INFRASTRUCTURE)
971

| SERVICE NAME | 2ND DID INFRASTRUCTURE-DEDICATED DID | EMAIL DESTINATION |
|---|---|---|
| GW SERVICE A | did:idyx:xyz··· | gw-a@... |
| GW SERVICE B | – | gw-b@... |
| VERIFICATION SERVICE C | – | verify-c@... |
| ... | ... | ... |

211  1ST VC
```
{
"id":"http://example.edu/credentials/1872",
"type":[VerifiableCredential","AlumniCredential"],
"credentialSubject":{"issuer":
"https://example.edu/issuers/565049",
"issuanceDate:":"2010-01-01T19:73:24Z",
 "alumniOf":{
 "id":
"did:example:c276e12ec21ebfeb1f712ebc6f1",
  "name":[[
   "value":"Example University",
   "lang":"en"
  },{
   "value":"Example d'Universite",
   "lang":"fr"
  ]]
 }
},
"proof":{ ··· }
```

221a  2ND VC
```
{
"id":"http://gw.new/credentials/1234",
"type":[VerifiableCredential","AlumniCredential"],
"issuer":"https://gw.new/issuers/5678,
"issuanceDate:":"2010-01-11T11:22:33Z"
"credentialSubject":{
"alumniOf":{
    "id":did:example:c276e12ec21ebfeb1f712ebc6f1"
    "originalCredential":{id:"http//···}
   "name":[[
   "value":"Example University",
   "lang":"en"
  },{
   "value":"Example d'Universite",
   "lang":"fr"
  ]]}
 },
"proof":{ ··· }
}
```

211 1ST VC

```
{
"id":"http://example.edu/credentials/1872",
"type":[VerifiableCredential","AlumniCredential"],
"credentialSubject":{"issuer":
"https://example.edu/issuers/565049",
"issuanceDate:":"2010-01-01T19:73:24Z",
"alumniOf":{
"id":
"did:example:c276e12ec21ebfeb1f712ebc6f1",
  "name":[{
   "value":"Example University",
   "lang":"en"
  },{
   "value":"Example d'Universite",
   "lang":"fr"
  }]
 }
},
"proof":{ ··· }
}
```

221c 2ND VC

```
{
"id":"http://gw.new/credentials/1234",
"type":[VerifiableCredential","AlumniCredential"],
"issuer":"https://gw.new/issuers/5678,
"issuanceDate:":"2010-01-11T11:22:33Z"
"credentialSubject":{
  "original id":"http://example.edu/credentials/1872",
  "original issuer":"https://example.edu/issuers/565049",
  "original issuanceDate:":"2010-01-01T19:73:24Z",
"alumniOf":{
    "id":did:example:c276e12ec21ebfeb1f712ebc6f1"
    "name":[{
     "value":"Example University",
     "lang":"en"
    },{
     "value":"Example d'Universite",
     "lang":"fr"
    }]
 "original proof":{ ··· }
  }
 },
"proof":{ ··· }
}
```

FIG. 25

VERIFIER LIST (VERIFIERS OF 1ST DID INFRASTRUCTURE)

971a

| SERVICE NAME | 2ND DID INFRASTRUCTURE-DEDICATED DID | SENDING METHOD | DESTINATION |
|---|---|---|---|
| GW SERVICE A | did:idyx:xyz··· | Mail | gw-a@... |
| GW SERVICE B | – | Web | https://abc.... |
| VERIFICATION SERVICE C | – | Web | https://def... |
| ... | ... | ... | ... |

FIG. 27

VERIFICATION METHOD AND INFORMATION PROCESSING APPARATUS

CROSS-REFERENCE TO RELATED APPLICATION

This application is based upon and claims the benefit of priority of the prior Japanese Patent Application No. 2022-024927, filed on Feb. 21, 2022, the entire contents of which are incorporated herein by reference.

FIELD

The embodiments discussed herein relate to a verification method and an information processing apparatus.

BACKGROUND

In recent years, the concept of self-sovereign identifiers (SSI) has been drawing attention, which aims to give individuals control over their own identities to compete with a world where giant private companies manage large amounts of personal data. In order to realize SSI systems, decentralized identifiers (DID) infrastructures using decentralized public key infrastructures (PKIs) are under development. DID infrastructures are mechanisms for individually managing personal attribute information (age, gender, etc.) with the signature of an issuer who guarantees the authenticity of the attribute information. Various companies and organizations are currently involved in development of DID infrastructures, and a wide range of management entities for DID infrastructures is expected to emerge in the future.

For example, in a DID infrastructure, a holder receives a certificate containing attribute information of the holder from an issuer. The certificate is plaintext character data, and a digital signature (hereinafter referred to simply as "signature") of the issuer is attached to the certificate. Such a certificate with a signature is referred to hereinafter as a verifiable credential (VC). Note that the certificate here refers not to a server certificate used in a decentralized PKI, but to a document with personal attribute information and the like.

The holder is able to prove their attributes by presenting a VC with the issuer's signature to a verifier. For example, a license center (issuer) issues a driver's license (VC) to a driver (holder). Through the use of a DID infrastructure, the driver is able to use their driver's license to prove to a liquor store (verifier) that they are 20 years old or older.

As a technique related to DID infrastructures, for example, there is a proposed method of issuing a digital certificate usable in multiple encryption systems. In addition, there is a proposed privacy authentication system capable of validating compliance with multiple hierarchical privacy policies in cross-border data access.

See, for example, Japanese Laid-open Patent Publications No. 2020-10396 and No. 2018-11203.

Currently, there are multiple DID infrastructures, and each DID infrastructure has a different signature and verification scheme. Therefore, for example, if a DID infrastructure used by an issuer to issue a VC is different from a DID infrastructure available to a verifier, verification of the VC fails. Thus, it is difficult to use VCs across different DID infrastructures.

In view of the above, it may be considered reasonable to allow third-party intermediary operators belonging to multiple DID infrastructures to replace signatures, thereby enabling the use of VCs across DID infrastructures. However, conventional technologies are not able to eliminate fraud committed by intermediary operators in charge of signature replacement. For example, such intermediary operators could arbitrarily issue VCs not signed by issuers. This creates a serious problem in case of not fully trusted intermediary operators being involved.

SUMMARY

According to an aspect, there is provided a non-transitory computer-readable recording medium storing therein a computer program that causes a computer to execute a process including acquiring a first verifiable credential (VC) that proves validity of attribute information of a holder by a first signature verifiable by verification procedures of a first decentralized identifiers (DID) infrastructure and a second VC that proves the validity of the attribute information of the holder by a second signature verifiable by verification procedures of a second DID infrastructure; verifying the second signature contained in the second VC by the verification procedures of the second DID infrastructure; transmitting a verification request for verifying the first signature contained in the first VC to a verification device capable of verifying the first signature contained in the first VC by the verification procedures of the first DID infrastructure; and acquiring, from the verification device, verification results of the first signature contained in the first VC.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of a verifier list;

FIG. 18 illustrates an example of the second VC containing the first VC;

FIG. 25 illustrates an example of the second VC with overlapping items removed therefrom;

FIG. 27 illustrates an example of a verifier list including verification request sending methods.

DESCRIPTION OF EMBODIMENTS

Several embodiments will be described below with reference to the accompanying drawings. These embodiments may be combined with each other unless they have contradictory features.

(a) First Embodiment

A first embodiment is directed to a signature verification method of deterring fraud in signature replacement for a different DID infrastructure.

Figure 1:
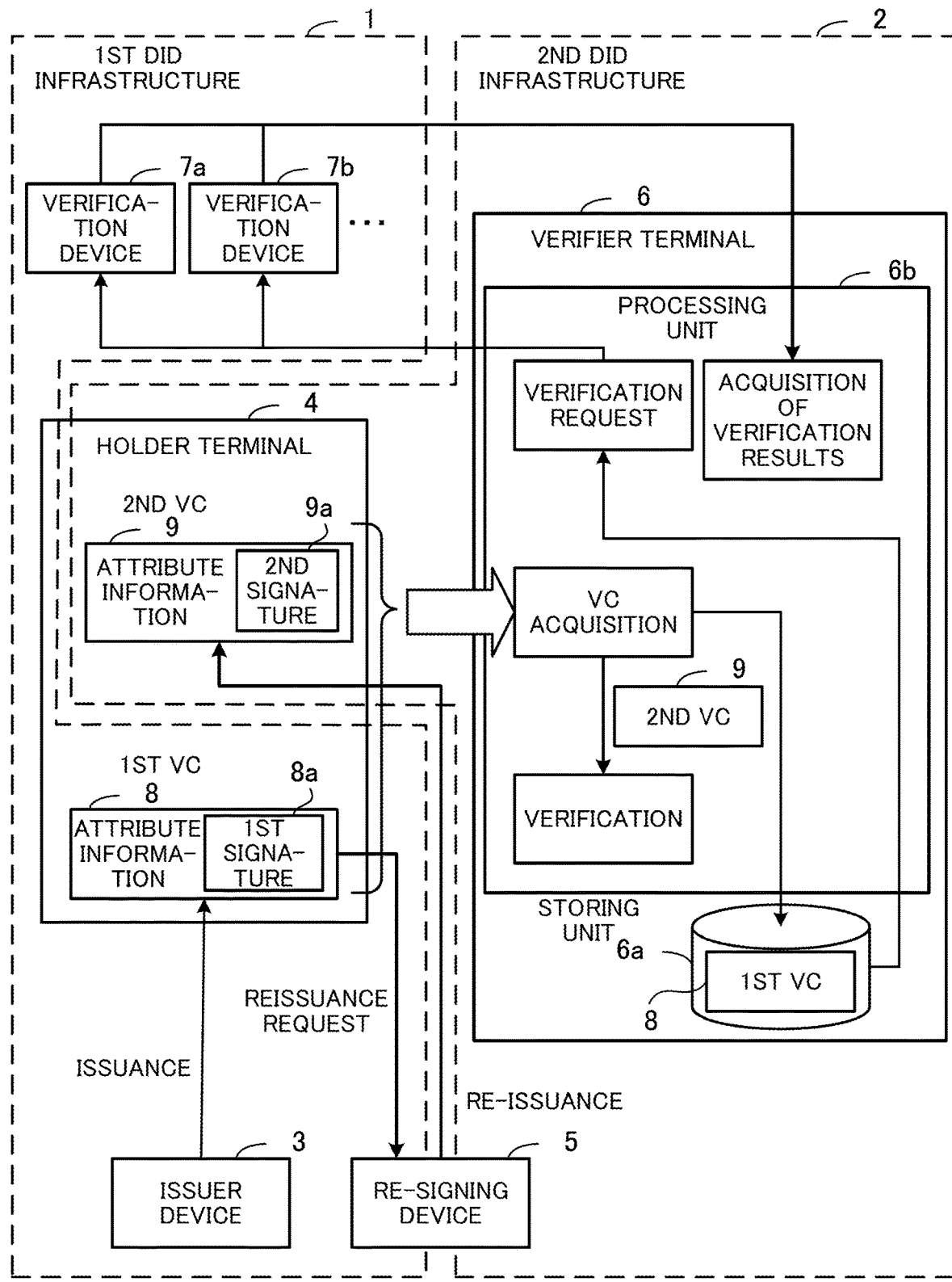
FIG. 1 illustrates an example of a verification method according to a first embodiment.

FIG. 1 illustrates an example of a verification method according to the first embodiment. FIG. 1 depicts a system for implementing the verification method. The system includes an issuer device 3, a holder terminal 4, a re-signing device 5, a verifier terminal 6, and multiple verification devices 7a, 7b, and so on. The issuer device 3, the holder terminal 4, the re-signing device 5, and the multiple verification devices 7a, 7b, and so on belong to a first decentralized identifiers (DID) infrastructure 1. The holder terminal 4, the re-signing device 5, and the verifier terminal 6 belong to a second DID infrastructure 2. That is, the holder terminal 4 and the re-signing device 5 belong to both the first DID infrastructure 1 and the second DID infrastructure 2. The multiple verification devices 7a, 7b, and so on may belong not only to the first DID infrastructure 1, but also to the second DID infrastructure 2.

The issuer device 3 is an information processor for managing attribute information of a holder who has the holder terminal 4. The attribute information of the holder is, for example, the holder's personal information, such as the name and a face photo. The holder terminal 4 is an information processor owned by the holder. The re-signing device 5 is an information processor for verifying a signature attached to a verifiable credential (VC) issued in the first DID infrastructure 1 and issuing a new VC according to VC issuance procedures of the second DID infrastructure 2. The verifier terminal 6 is an information processor used by a verifier who wants to validate the authenticity of the attribute information presented by the holder. The verification devices 7a, 7b, and so on are information processors capable of verifying a signature attached to a VC according to verification procedures of the first DID infrastructure 1.

The information processor that functions as the verifier terminal 6 is, for example, a computer (including a handheld terminal) with a storing unit 6a and a processing unit 6b. The storing unit 6a is, for example, a memory or storage device. The processing unit 6b is, for example, a processor or arithmetic circuit. Similarly, the information processors individually functioning as the issuer device 3, the holder terminal 4, the re-signing device 5, and the verification devices 7a, 7b, and so on are, for example, computers (including handheld terminals) with a storing unit and a processing unit. Such a computer is able to function as the issuer device 3, the holder terminal 4, the re-signing device 5, or each of the verification devices 7a, 7b, and so on by executing a predetermined program. For example, the verifier terminal 6 runs a verification program to perform a verifying process of an acquired VC.

Assume here a case where, in a system with the above-described configuration, a holder whose attribute information is managed in the first DID infrastructure 1 presents the attribute information to a verifier having the verifier terminal 6 compatible only with the second DID infrastructure 2. Assume further that, at this time, the verifier requests that the attribute information presented by the holder be verified through verification procedures of the second DID infrastructure 2. In this case, the following process is performed.

First, the issuer device 3 issues a first VC 8 proving that the attribute information of the holder is valid by means of a first signature 8a which is verifiable through the verification procedures of the first DID infrastructure 1. The holder terminal 4 acquires the first VD 8 from the issuer device 3. The holder terminal 4 sends, to the re-signing device 5, a request for reissuance of a VC based on the first VC 8. The reissuance request includes the first VC 8.

In response to the reissuance request, the re-signing device 5 issues a second VC 9 proving that the attribute information of the holder is valid by means of a second signature 9a which is verifiable through the verification procedures of the second DID infrastructure 2. For example, the re-signing device 5 verifies the first signature 8a of the first VC 8 through the verification procedures of the first DID infrastructure 1, and issues the second VC 9 when the attribute information contained in the first VC 8 is confirmed to be valid.

The holder terminal 4 acquires the second VC 9 from the re-signing device 5. Then, the holder terminal 4 transmits the first VC 8 and the second VC 9 to the verifier terminal 6.

The processing unit 6b of the verifier terminal 6 acquires the first VC 8 and the second VC 9. Then, the processing unit 6b verifies the second signature 9a contained in the second VC 9 through the verification procedures of the second DID infrastructure 2. The processing unit 6b outputs the verification results. For example, when the verification is successful, the processing unit 6b displays, on a monitor, the verification results indicating that the attribute information of the holder is valid.

In addition, the processing unit 6b stores the acquired first VC 8, for example, in the storing unit 6a. Subsequently, the processing unit 6b sends a request to verify the first signature 8a contained in the first VC 8 to at least one of the verification devices 7a, 7b, and so on. The verification device having received the verification request verifies the first signature 8a contained in the first VC 8 through the verification procedures of the first DID infrastructure 1. The processing unit 6b of the verifier terminal 6 acquires the verification results for the first signature 8a contained in the first VC 8 from the verification device having performed the verification. Then, upon acquisition of the verification results for the first signature 8a, the processing unit 6b determines based on the verification results whether the issuance procedures of the second VC 9 are fraudulent.

According to the system described above, if having doubts about the legitimacy of the VC reissuing process (signature replacement), the verifier sends a verification request from the verifier terminal 6 to one of the verification devices 7a, 7b, and so on to acquire the verification results. Conceivable fraudulent acts involved in signature replacement include, for example, rewriting of the attribute information and issuance of the second VC 9 by the re-signing device 5 without verifying the validity of the attribute information of the first VC 8 using the first signature 8a.

Because the first VC 8 and the second VC 9 are supposed to share the same attribute information, fraudulent rewriting of the attribute information is expected to be made to both the first VC 8 and the second VC 9. If the attribute information has been rewritten in signature replacement, the verification results produced by any one of the verification devices 7a, 7b, and so on indicate that the attribute information is invalid. Herewith, it is possible to detect the fraud.

Note that if rewriting of the attribute information is made only to the second VC 9, verification of the first signature 8a attached to the first VC 8 yields results indicating that the attribute information is valid. For this reason, the processing unit 6b may check the identity of the attribute information between the first VC 8 and the second VC 9. If the attribute information is not the same, the processing unit 6b is able to determine the existence of fraud without performing signature verification or the like.

Even if the re-signing device 5 has issued the second VC 9 without verifying the first signature 8a even though the attribute information of the first VC 8 had been tampered, the verification results obtained by any one of the verification devices 7a, 7b, and so on indicate that the attribute information is invalid. Herewith, it is possible to detect the fraud.

In this manner, the verifier terminal 6 belonging to the second DID infrastructure 2 is able to detect fraud in signature replacement by the use of the first VC 8 when not being able to verify the first signature 8a of the first VC 8 created in the first DID infrastructure 1. Thus, provision of the means for confirming the existence or nonexistence of fraud makes it difficult to conceal fraudulent acts, and is therefore expected to help deter such activity.

Another conceivable case is that the re-signing device 5 issues the second VC 9 for attribute information for which the issuer device 3 has not issued a VC. In this case, transmission of the first VC 8 from the holder terminal 4 to the verifier terminal 6 fails. For example, without the first VC 8 from the holder terminal 4, the processing unit 6b does not determine the validity of the attribute information of the second VC 9. Therefore, by stipulating that the first VC 8 also needs to be transmitted to the verifier terminal 6, it is possible to prevent the re-signing device 5 from issuing the second VC 9 not based on the first VC 8.

When sending a verification request, the processing unit 6b of the verifier terminal 6 selects a predetermined number of verification devices from, for example, a verifier list enumerating multiple verification devices, and transmits the verification request to the selected verification devices. Then, the processing unit 6b determines that no fraud has been committed in the issuance procedures of the second VC 9 when verification results indicating that the attribute information has been verified to be valid based on the first signature 8a are obtained from the number of verification devices equal to or greater than a threshold (e.g., more than half of the total number of requested verification devices). On the other hand, the processing unit 6b determines that some fraud has been involved in the issuance procedures of the second VC 9 if the number of verification devices with verification results indicating that the attribute information has been verified to be valid based on the first signature 8a is less than the threshold.

Thus, the existence or nonexistence of fraud is determined based on whether the verification results indicating the validity of the attribute information have been received from a certain number or more of verification devices. This improves the determination accuracy. That is, it is sometimes difficult to determine which of the verification devices 7a, 7b, and so on of the first DID infrastructure 1 have produced reliable verification results. Determination of the existence or nonexistence of fraud based on the verification results of a large number of verification devices leads to correct determination results in the end even if there are some verification devices managed by a person taking part in fraudulent activity.

Note that the re-signing device 5 is also able to verify the first signature 8a attached to the first VC 8. However, it is inappropriate to send the verification request to the re-signing device 5 because making such a verification request to any of the verification devices is a process carried out when fraudulent activity on the re-signing device 5 is suspected. In view of this, when selecting verification devices to which a verification request is sent, the processing unit 6b excludes the re-signing device 5, which is the issuer of the second VC 9, from the selection targets. Herewith, it is possible to improve the reliability of the verification results obtained from verification devices.

Note that a fraudulent act in signature replacement may possibly be committed on the holder terminal 4 or on the re-signing device 5. It is sometimes desired to clearly determine not only the existence of fraud, but also where the fraud has occurred, i.e., at the holder terminal 4 or the re-signing device 5. In view of this, the re-signing device 5 is configured to create the second VC 9 containing the first VC 8. In this case, the second VC 9 includes information representing the first VC 8, and the second signature 9a attached to the second VC 9 serves as information for proving the validity of the first VC 8 and the attribute information. The processing unit 6b of the verifier terminal 6 verifies the validity of the attribute information and the first VC 8 based on the second signature 9a.

In the case where the first VC 8 is included in the second VC 9, if a fraudulent act (e.g., rewriting of the attribute information) is committed on the re-signing device 5, verification results obtained for the second signature 9a attached to the second VC 9 indicate that the attribute information is valid. On the other hand, the verification of the first signature 8a attached to the first VC 8 yields results indicating that the attribute information is invalid. If a fraudulent act (e.g., rewriting of the attribute information) is committed on the holder terminal 4, not only verification results obtained for the first signature 8*a* of the first VC 8 but also those obtained for the second signature 9*a* of the second VC 9 indicate that the attribute information is invalid. Such a difference in the verification results allows the processing unit 6*b* of the verifier terminal 6 to identify where the fraud has been exercised.

In the case of including the first VC 8 in the second VC 9, there is no need to introduce a processing component for transmitting the first VC 8 into the holder terminal 4, other than a processing component for transmitting the second VC 9.

Simple inclusion of the first VC 8 in the second VC 9 results in duplicate attribute information in the second VC 9. Therefore, the re-signing device 5 may eliminate duplication of the attribute information between the first VC 8 and the second VC 9 when creating the second VC 9 including information representing the first VC 8. In this case, in retrieving the first VC 8 from the second VC 9, the processing unit 6*b* of the verifier terminal 6 reconstructs the first VC 8 based on the second VC 9.

Elimination of the duplicate attribute information in this manner results in a reduction in the data volume transmitted from the holder terminal 4 to the verifier terminal 6.

(b) Second Embodiment

Next described is a second embodiment. The second embodiment is directed to a system capable of verifying a VC across multiple DID infrastructures.

Figure 2:
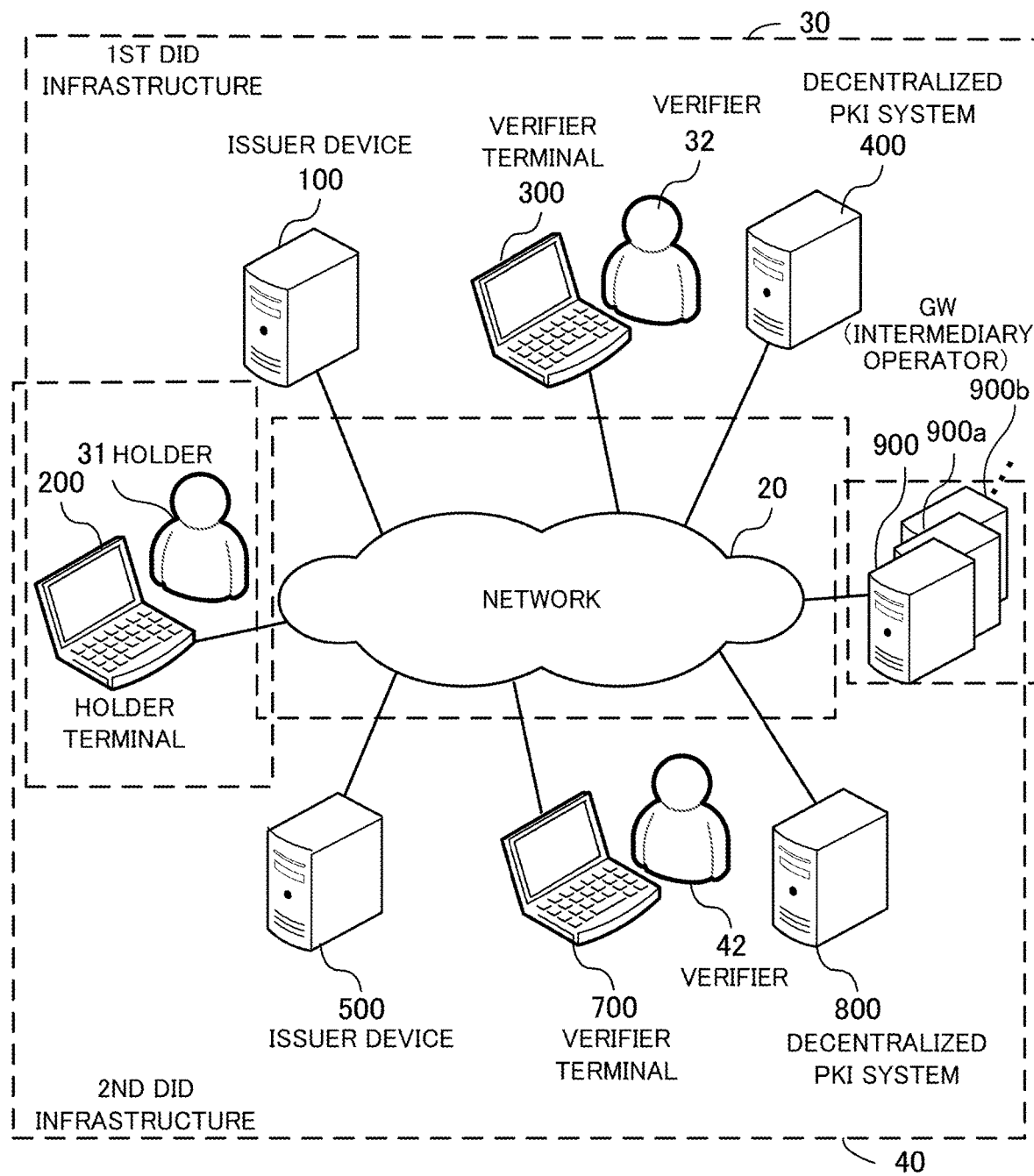
FIG. 2 illustrates an example of a system structure.

FIG. 2 illustrates an example of a system structure. The example of FIG. 2 depicts two DID infrastructures (a first DID infrastructure 30 and a second DID infrastructure 40) having different signature and verification schemes. Each of the first DID infrastructure 30 and the second DID infrastructure 40 is a system infrastructure allowing individuals to manage their personal attribute information on their own.

Devices belonging to the first DID infrastructure 30 and the second DID infrastructure 40 are connected to a network 20. Devices belonging to the first DID infrastructure 30 include an issuer device 100, a holder terminal 200, a verifier terminal 300, a decentralized PKI system 400, and multiple gateways (GWs) 900, 900*a*, 900*b*, and so on. Devices belonging to the second DID infrastructure 40 include the holder terminal 200, an issuer device 500, a verifier terminal 700, a decentralized PKI system 800, and the GWs 900, 900*a*, 900*b*, and so on.

Each of the issuer devices 100 and 500 is one or more computers managed by an issuer who issues VCs. The holder terminal 200 is a computer managed by a holder 31 who uses a VC to prove their own attributes. The verifier terminals 300 and 700 are computers individually managed by verifiers 32 and 42 who verify the attributes of the holder 31 based on the VC. Each of the decentralized PKI systems 400 and 800 is one or more computers that manage public keys. The decentralized PKI systems 400 and 800 may individually manage the public keys on a decentralized ledger, such as a blockchain.

The GWs 900, 900*a*, 900*b*, and so on are computers managed by intermediary operators providing VC re-signing services. The GWs 900, 900*a*, 900*b*, and so on belong to both the first DID infrastructure 30 and the second DID infrastructure 40, as depicted in FIG. 2, and are able to use both the decentralized PKI systems 400 and 800.

Figure 3:
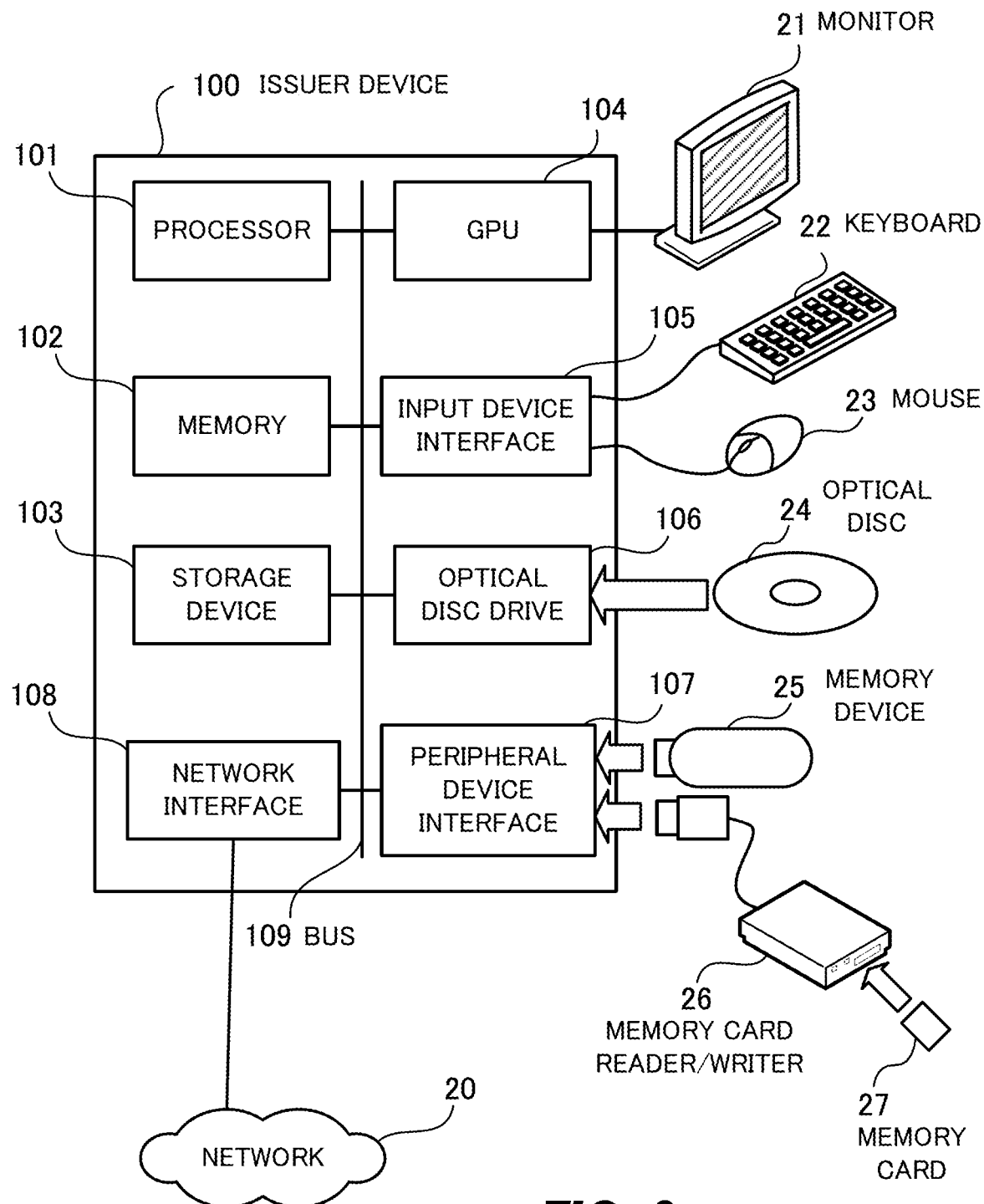
FIG. 3 illustrates an example of a hardware platform of an issuer device.

FIG. 3 illustrates an example of a hardware platform of an issuer device. The issuer device 100 has a processor 101 to control its entire operation. The processor 101 is connected to a memory 102 and other various devices and interfaces via a bus 109. The processor 101 may be a single processing device or a multiprocessor system including two or more processing devices, such as a central processing unit (CPU), micro processing unit (MPU), and digital signal processor (DSP). It is also possible to implement processing functions of the processor 101 and its programs wholly or partly into an application-specific integrated circuit (ASIC), programmable logic device (PLD), or other electronic circuits, or any combination of them.

The memory 102 serves as the primary storage device in the issuer device 100. Specifically, the memory 102 is used to temporarily store at least some of the operating system (OS) programs and application programs that the processor 101 executes, as well as various types of data to be used by the processor 101 for its processing. For example, the memory 102 may be implemented using a random access memory (RAM) or other volatile semiconductor memory devices.

Other devices on the bus 109 include a storage device 103, a graphics processing unit (GPU) 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device in the computer to store program and data files of the operating system and applications. For example, the storage device 103 may be implemented using hard disk drives (HDD) or solid state drives (SSD).

The GPU 104 is an arithmetic unit that performs image processing, and is also called a graphic controller. The GPU 104, coupled to a monitor 21, produces video images in accordance with drawing commands from the processor 101 and displays them on a screen of the monitor 21. The monitor 21 may be, for example, an organic electro-luminescence (OEL) display or a liquid crystal display.

The input device interface 105 is connected to input devices, such as a keyboard 22 and a mouse 23, and supplies signals from those devices to the processor 101. The mouse 23 is a pointing device, which may be replaced with other kinds of pointing devices, such as a touchscreen, tablet, touchpad, and trackball.

The optical disc drive 106 reads out data encoded on an optical disc 24 or writes data to the optical disc 24 by using laser light. The optical disc 24 is a portable storage medium on which data is recorded in such a manner as to be read by reflection of light. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the issuer device 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to the network 20 so as to exchange data with other computers or communication devices (not illustrated). The network interface 108 is a wired communication interface connected to a wired communication device, such as a switch or router, with a cable. Alternatively, the network interface 108 may be a wireless communication interface communicatively connected to a wireless communication device, such as a base station and an access point, using radio waves.

The issuer device 100 may be realized with the above-described hardware configuration. Each of the issuer device 500, the holder terminal 200, the verifier terminals 300 and 700, the decentralized PKI systems 400 and 800, and the GWs 900, 900a, 900b, and so on may be delivered with the same hardware configuration as the issuer device 100. In addition, each of the issuer device 3, the holder terminal 4, the re-signing device 5, the verifier terminal 6, and the verification devices 7a, 7b, and so on of the first embodiment may be delivered with the same hardware configuration as the issuer device 100 depicted in FIG. 3.

The issuer device 100 provides various processing functions of the second embodiment by, for example, executing computer programs stored in a computer-readable storage medium. A variety of storage media are available for recording programs to be executed by the issuer device 100. For example, the issuer device 100 may store program files in its own storage device 103. The processor 101 reads out at least part of those programs from the storage device 103, loads them into the memory 102, and executes the loaded programs. Other possible storage locations for the programs include the optical disc 24, the memory device 25, the memory card 27, and other portable storage media. The programs stored in such a portable storage medium are installed in the storage device 103 under the control of the processor 101, so that they are ready to be executed upon request. It may also be possible for the processor 101 to execute program codes read out of a portable storage medium, without installing them in its local storage devices.

The issuer device 500, the holder terminal 200, the verifier terminals 300 and 700, the decentralized PKI systems 400 and 800, and the GWs 900, 900a, 900b, and so on may also be implemented by executing programs stored in computer-readable recording media.

When there are two DID infrastructures, as illustrated in FIG. 2, if the holder and the verifier belong to the same DID infrastructure, it is easy for the holder to prove their attribute information to the verifier.

Figure 4:
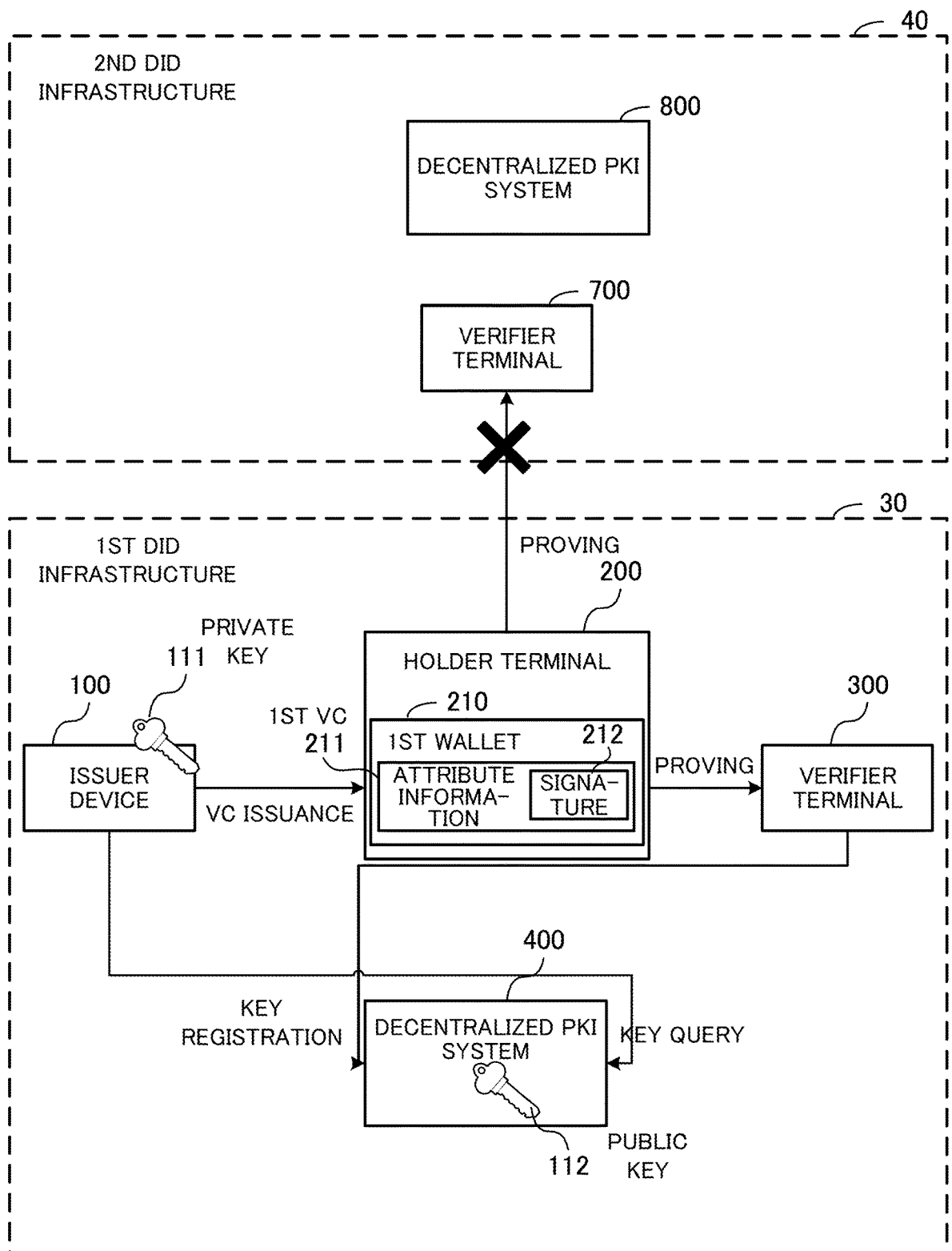
FIG. 4 illustrates an example of procedures for proving attribute information within the same DID infrastructure.

FIG. 4 illustrates an example of procedures for proving attribute information within the same DID infrastructure. The example of FIG. 4 assumes that the holder 31 (see FIG. 2) belonging to the first DID infrastructure 30 proves the validity of attribute information representing their attributes to the verifier 32 (see FIG. 2) belonging to the same first DID infrastructure 30.

The issuer device 100 generates a pair of a private key 111 and a public key 112 of the issuer. The issuer device 100 registers the public key 112 in the decentralized PKI system 400 to thereby enable other devices belonging to the first DID infrastructure 30 to use the public key 112.

The issuer device 100 issues a first VC 211 with a signature 212, for example, in response to a request from the holder 31. The first VC 211 contains attribute information of the holder 31. For example, if the first VC 211 is a driver's license, the first VC 211 includes, for example, the name, date of birth, sex, address, and license number of the holder 31. The signature 212 is a digital signature generated using the private key 111 of the issuer according to specifications of the first DID infrastructure 30.

The holder 31 receives the first VC 211 issued by the issuer device 100 at the holder terminal 200. The holder terminal 200 manages the first VC 211 in a first wallet 210. The first wallet 210 is implemented, for example, by running application software provided by an organization operating the first DID infrastructure 30.

In order for the holder 31 to prove their attribute information to the verifier 32, the holder 31 transmits the first VC 211 from the holder terminal 200 to the verifier terminal 300.

The verifier terminal 300 queries the decentralized PKI system 400 for the public key 112 of the issuer. The decentralized PKI system 400 transmits the appropriate public key 112 to the verifier terminal 300. The verifier terminal 300 verifies the signature 212 using the public key 112, and confirms that the contents of the first VC 211 have been certified by the issuer device 100. Herewith, the holder 31 is able to prove their attributes to the verifier 32. In the case where the attribute information contained in the first VC 211 is information of the driver's license of the holder 31, the holder 31 is able to prove to the verifier 32 operating a liquor store that they are 20 years old or older.

On the other hand, the holder 31 is not able to use the first VC 211 to prove the validity of the attribute information representing their attributes to a verifier 42 belonging to the second DID infrastructure 40 different from the first DID infrastructure 30. That is, even if the holder terminal 200 transmits the first VC 211 to the verifier terminal 700 belonging to the second DID infrastructure 40, the verifier terminal 700 has no verification means to use the signature 212. Therefore, the verifier 42 having the verifier terminal 700 is not able to confirm the validity of the attribute information on the first VC 211.

As described above, the attribute information on the first VC 211 may be easily proved within the first DID infrastructure 30; however, it is difficult to prove the attribute information across the two DID infrastructures. It may be considered reasonable, as a method of proving the attribute information across the two DID infrastructures, for example, to allow a GW, which is a third party belonging to both the first DID infrastructure 30 and the second DID infrastructure 40, to replace the signature of the already issued VC.

Figure 5:
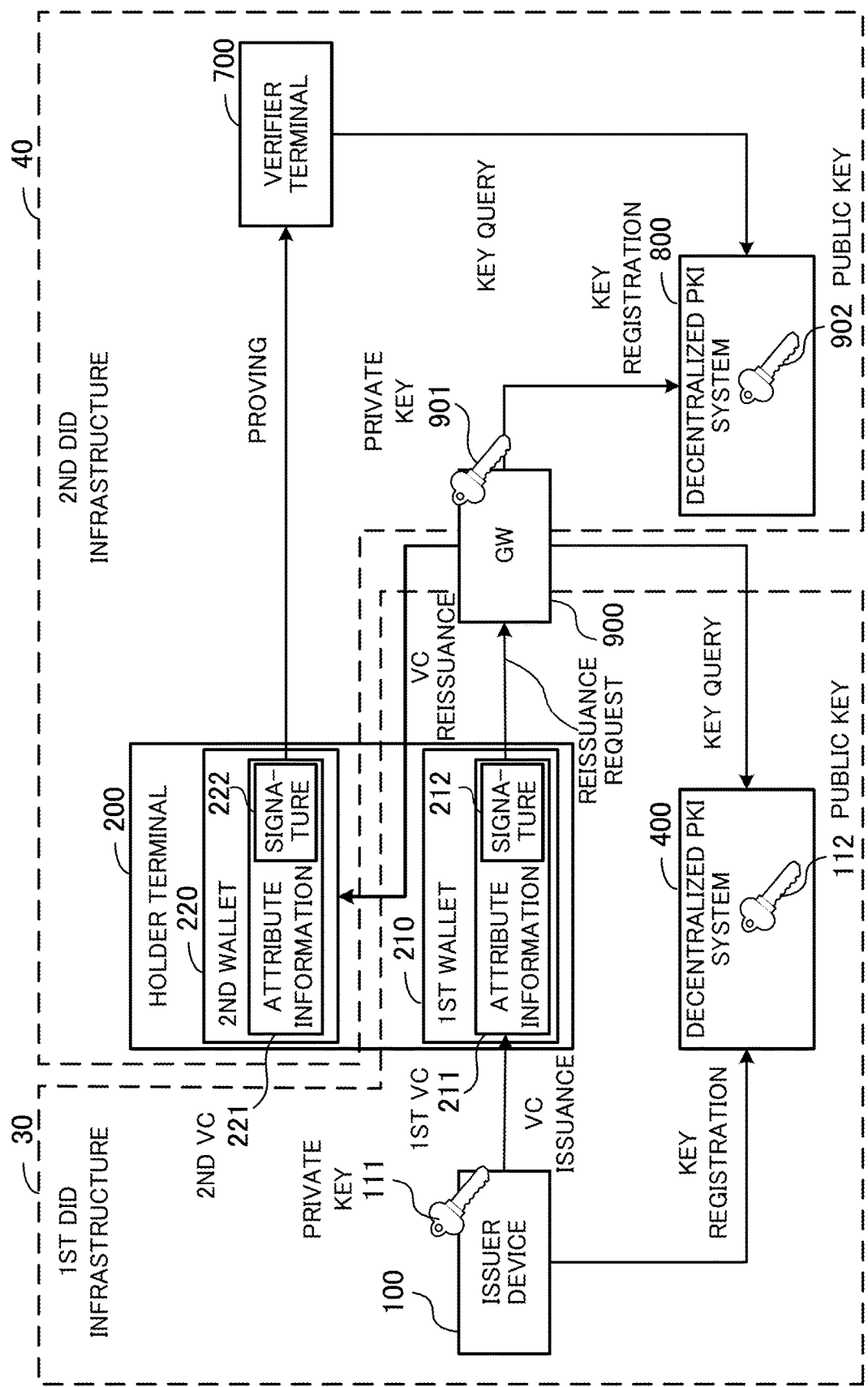
FIG. 5 illustrates an example of a method of proving the attribute information across DIDs.

FIG. 5 illustrates an example of a method of proving attribute information across DIDs. The example of FIG. 5 depicts signature replacement performed by the GW 900 which is managed by a third party intermediary operator. The GW 900 generates a pair of a private key 901 and a public key 902 and registers the public key 902 in the decentralized PKI system 800 of the second DID infrastructure 40. After that, for example, the holder terminal 200 transmits the first VC 211 with the signature 212 to the GW 900 and requests the GW 900 to reissue a signature.

In response to the signature reissuance request from the holder terminal 200, the GW 900 queries the decentralized PKI system 400 of the first DID infrastructure 30 for the public key 112 of the issuer. The GW 900 acquires the public key 112 from the decentralized PKI system 400 and verifies the signature 212 of the first DID infrastructure 30 using the public key 112. Then, as an issuer of the second DID infrastructure 40, the GW 900 uses its own private key 901 to generate a signature 222 for attribute information newly written on a second VC 221. The GW 900 transmits the second VC 221 with the signature 222 attached to the attribute information to the holder terminal 200.

The holder terminal 200 has a second wallet 220 corresponding to the second DID infrastructure 40, separately from the first wallet 210 corresponding to the first DID infrastructure 30. That is, the first wallet 210 is a function belonging to the first DID infrastructure 30 while the second wallet 220 is a function belonging to the second DID infrastructure 40. The function of the second wallet 220 is to manage a VC for the second DID infrastructure 40. The second wallet 220 is implemented, for example, by running application software provided by an organization operating the second DID infrastructure 40.

The holder terminal 200 transmits the second VC 221 including the signature 222 to the verifier terminal 700 of the second DID infrastructure 40 to prove the attribute information using the second VC 221. The verifier terminal 700 queries the decentralized PKI system 800 of the second DID infrastructure 40 for the public key 902 of the intermediary operator. The verifier terminal 700 acquires the public key 902 from the decentralized PKI system 800. Then, the verifier terminal 700 uses the acquired public key 902 to verify the signature 222, and confirms the validity of the contents of the second VC 221.

With the method illustrated in FIG. 5, if the GW 900 may be expected to correctly verify a signature in each DID infrastructure, it is possible to prove attribute information across the DID infrastructures based on the first VC 211. As a result, replacing a signature afterward by the GW 900 allows for proving attribute information in a different DID infrastructure, even one which is unintended at the time of issuance of the first VC 211.

However, the method depicted in FIG. 5 allows the GW 900 to give a signature also to attribute information to which a signature has not been given by the issuer device 100. Therefore, the method of FIG. 5 is flawed in terms of deterring fraud exercised by the intermediatory operator running the GW 900.

In view of the above problem, the holder terminal 200 transmits the first VC 211 in addition to the second VC 221 when proving the attribute information to the verifier terminal 700. The verifier 42 using the verifier terminal 700 is able to check for fraud based on the first VC 211 when fraudulent signature replacement on the GW 900 is suspected. For example, the holder terminal 200 requests a GW other than the GW 900 to verify the signature 212 of the first VC 211. If the verification of the signature 212 of the first VC 211 by the requested GW fails (the signature 212 is determined to be "Invalid"), a fraudulent act is determined to have occurred. Thus, allowing for checking the existence or nonexistence of fraud afterward will help deter fraudulent acts on the GW 900.

Figure 6:
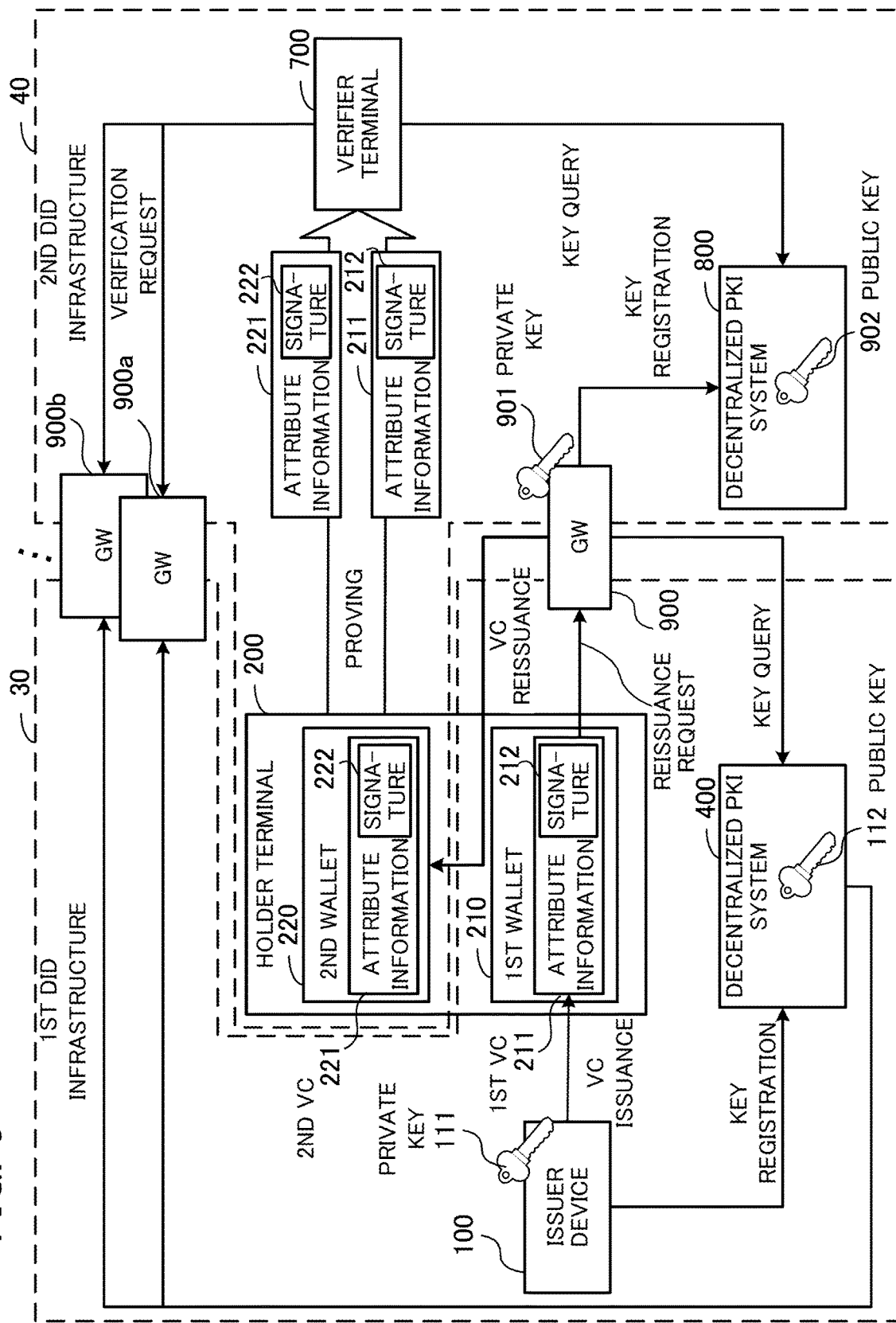
FIG. 6 illustrates an example of a signature replacement method according to a second embodiment.

FIG. 6 illustrates an example of a signature replacement method according to the second embodiment. In FIG. 6, the processes from issuing the second VC 221 by the GW 900 up to storing the second VC 221 in the second wallet 220 of the holder terminal 200 are the same as those depicted in the example of FIG. 5. Subsequently, when the holder 31 using the holder terminal 200 wants to prove their own attribute information to the verifier 42, both the first VC 211 and the second VC 221 are transmitted from the holder terminal 200 to the verifier terminal 700.

Figure 7:
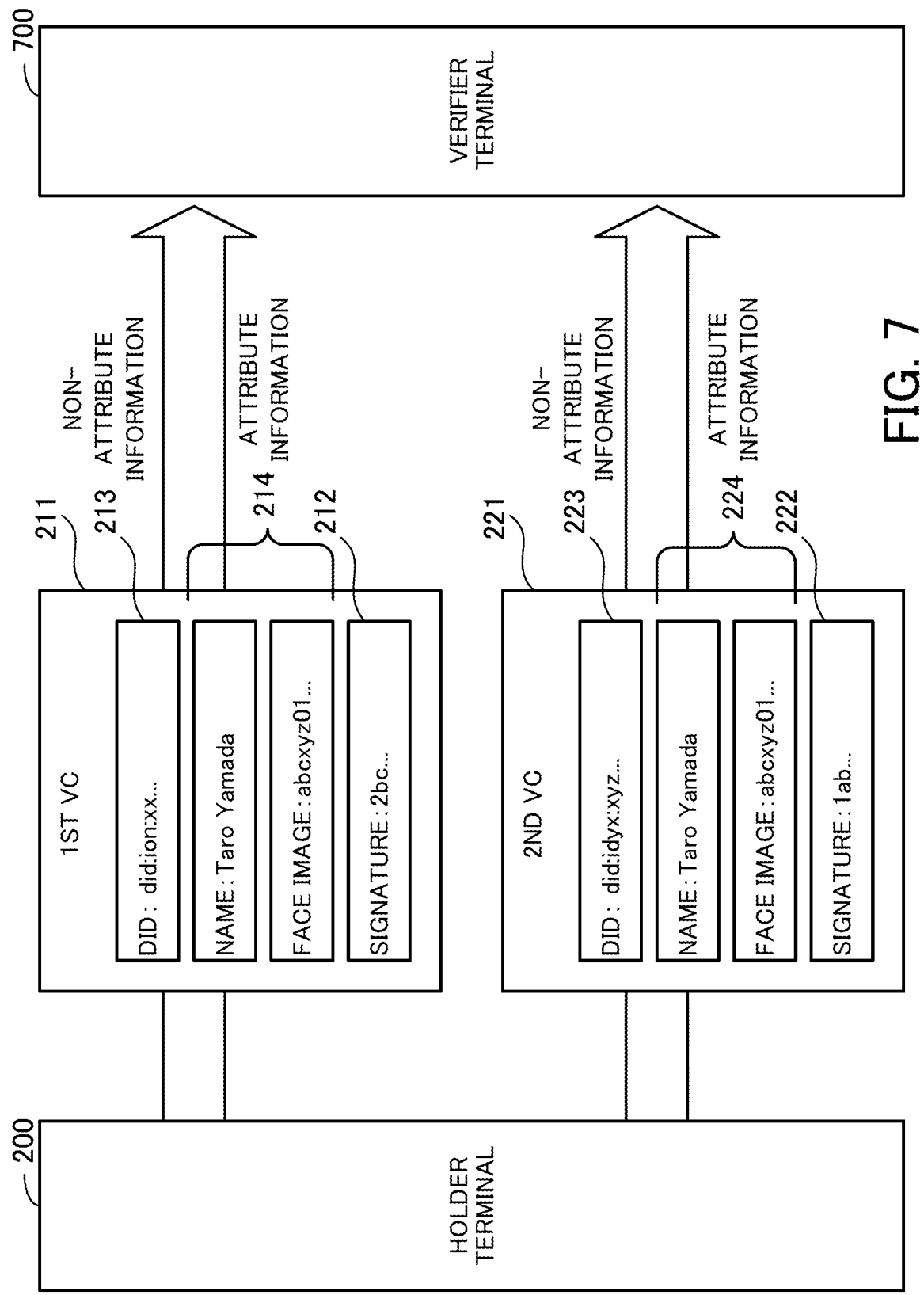
FIG. 7 illustrates an example of transmitted first VC and second VC.

FIG. 7 illustrates an example of transmitted first VC and second VC. The first VC 211 includes non-attribute information 213, attribute information 214, and the signature 212 corresponding to the non-attribute information 213 and the attribute information 214. The non-attribute information 213 contains, for example, DID information. The DID included in the first VC 211 is information used to identify the first VC 211 within the first DID infrastructure 30. The attribute information 214 contains information including name, face image, and so on. The second VC 221 includes non-attribute information 223, attribute information 224, and the signature 222 corresponding to the non-attribute information 223 and the attribute information 224. The non-attribute information 223 contains, for example, DID information. The DID included in the second VC 221 is information used to identify the second VC 221 within the second DID infrastructure 40. The attribute information 224 contains information including name, face image, and so on.

Now refer back to FIG. 6.

The verifier terminal 700 uses the signature 222 of the second VC 221 to verify the attribute information 224 on the second VC 221. That is, the verifier terminal 700 acquires the public key 902 of the intermediatory operator running the GW 900 from the decentralized PKI system 800 in the second DID infrastructure 40. Then, using the acquired public key 902, the verifier terminal 700 verifies the validity of the signature 222 attached to the second VC 221 according to procedures defined for the second DID infrastructure 40.

In addition, in response to an instruction from the verifier 42 to verify the signature 212 attached to the first VC 211, the verifier terminal 700 transmits a verification request to a predetermined number of GWs 900a, 900b, and so on, other than the GW 900. For example, the verifier terminal 700 transmits the verification request by e-mail or the like to the predetermined number of GWs. The verification request includes the first VC 211.

For example, if the GW 900a has received the verification request, the GW 900a acquires the public key 112 of the issuer of the first VC 211 from the decentralized PKI system 400 of the first DID infrastructure 30. Using the acquired public key 112, the GW 900a verifies the validity of the signature 212 attached to the first VC 211 according to procedures defined for the first DID infrastructure 30. For example, upon reception of the verification request, the GW 900a performs verification by importing the received digital data into a verification component of the first DID infrastructure 30. This verification method complies with the procedures defined for the first DID infrastructure 30. Then, the GW 900a transmits the verification results (valid or invalid) to the verifier terminal 700. Other GWs (e.g., the GW 900b) having received the verification request also perform a verifying process similar to that of the GW 900a described above.

The verifier terminal 700 checks the validity of the first VC 211 based on the verification results returned from the GWs to which the verification request has been sent. For example, the verifier terminal 700 confirms the validity of the signature 212 attached to the first VC 211 based on unanimous or majority verification results. If the unanimity rule is adopted, the verifier terminal 700 determines that the signature 212 attached to the first VC 211 is valid upon reception of responses with "Valid" from all the GWs to which the verification request has been sent. If the majority rule is adopted, the verifier terminal 700 determines that the signature 212 attached to the first VC 211 is valid when the number of GWs having returned responses with "Valid" exceeds half of all the GWs to which the verification request has been sent.

Thus, the holder terminal 200 transmits the first VC 211 to the verifier terminal 700 in addition to the second VC 221 so that, even if the GW 900 wrongly issues a signature, the verifier terminal 700 is able to check for the existence of fraud by requesting other GWs to verify the signature 212. By establishing a method of confirming the existence or nonexistence of fraud as described above, it is possible to prevent fraudulent acts in signature replacement exercised on the GW 900. That is, the verifier terminal 700 in the second DID infrastructure 40 is not able to verify the validity of the signature 212 attached to the first VC 211; however, when there is some distrust for the operation of the GW 900, the verifier terminal 700 requests GWs other than the GW 900 to verify the validity of the signature 212 to thereby check for the legitimacy of the operation of the GW 900.

In selecting destinations for the verification request amongst the GWs 900a, 900b, and so on, it is desirable that the verifier terminal 700 select GWs discretely such that there would be no collusion between them. Note however that the above-described verifying process for the signature 212 is provided only for securing verification means for deterring fraudulent acts on the GW 900, and the verifier terminal 700 in the second DID infrastructure 40 does not always implement this process.

Next described are functions of the individual devices for realizing the processes depicted in FIG. 6.

Figure 8:
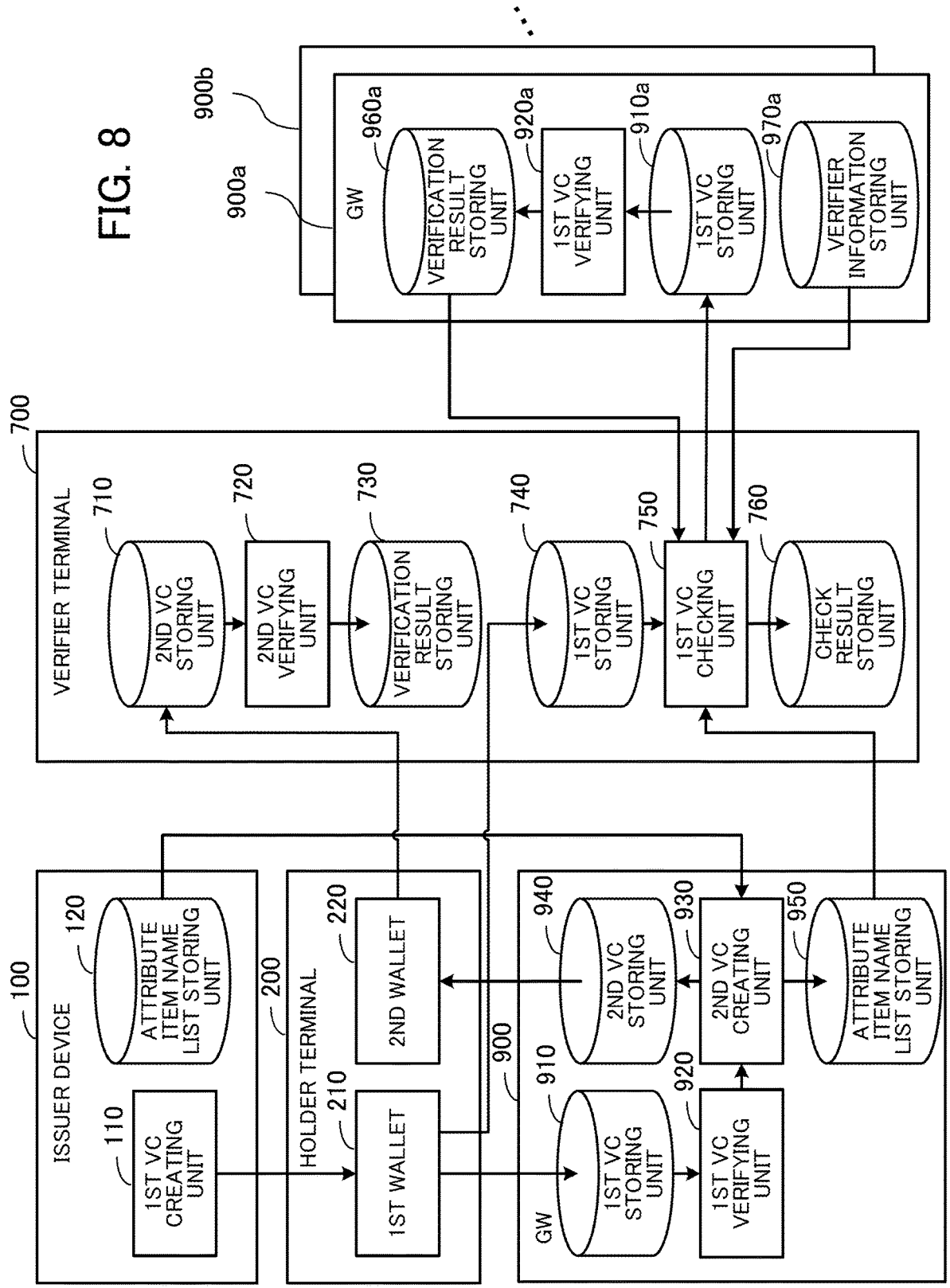
FIG. 8 is a block diagram representing an example of functions of each device according to the second embodiment.

FIG. 8 is a block diagram illustrating an example of functions of each device according to the second embodiment. The issuer device 100 includes a first VC creating unit 110 and an attribute item name list storing unit 120. The first VC creating unit 110 creates the first VC 211 including the attribute information 214 of the holder 31, for example, in response to a VC creation request from the holder terminal 200. Then, the first VC creating unit 110 transmits the created first VC 211 to the holder terminal 200. The attribute item name list storing unit 120 stores an attribute item name list. The attribute item name list enumerates item names of items representing attribute information of the holder 31 amongst information included in the first VC 211. For example, the information included in the first VC 211 is represented by a list of pairs of an item name (key) and an item value (value). The information included in the first VC 211 contains the non-attribute information 213 used on a DID system and the attribute information 214 about personal attributes. The attribute item name list enumerates keys representing item names of the attribute information 214.

For example, the attribute item name list storing unit 120 stores therein information read as "attribute item name list={firstName, lastName, age}". The attribute item name list in this example indicates that the first name (firstName), last name (lastName), and age (age) of the holder 31 amongst the information included in the first VC 211 correspond to the attribute information 214. The attribute item name list stored in the attribute item name list storing unit 120 is information open to the public. Therefore, for example, the GW 900 is able to acquire the attribute item name list from the issuer device 100.

The holder terminal 200 includes the first wallet 210 and the second wallet 220, as depicted in FIG. 6. When the holder 31 wants to prove their own attribute information to the verifier 42, the first VC 211 acquired from the first wallet 210 and the second VC 221 acquired from the second wallet 220 are transmitted from the holder terminal 200 to the verifier terminal 700, for example.

The GW 900 includes a first VC storing unit 910, a first VC verifying unit 920, a second VC creating unit 930, a second VC storing unit 940, and an attribute item name list storing unit 950. The first VC storing unit 910 stores therein the first VC 211 sent from the holder terminal 200 together with a reissuance request. The first VC verifying unit 920 verifies the signature 212 attached to the first VC 211 according to verification procedures defined for the first DID infrastructure 30.

When the verification of the signature 212 attached to the first VC 211 is successful, the second VC creating unit 930 creates the second VC 221 by transcribing the attribute information of the first VC 211 according to VC issuance procedures defined for the second DID infrastructure 40. At that time, the second VC creating unit 930 acquires the attribute item name list from the issuer device 100, and determines attribute information amongst the information included in the first VC 211 based on the acquired attribute item name list. The second VC storing unit 940 stores therein the second VC 221 created by the second VC creating unit 930. The second VC 221 stored in the second VC storing unit 940 is transmitted to the holder terminal 200 as a response to the reissuance request.

The attribute item name list storing unit 950 stores therein the attribute item name list acquired from the issuer device 100 by the second VC creating unit 930. The attribute item name list stored in the attribute item name list storing unit 950 is information open to the public. Therefore, for example, the verifier terminal 700 is able to acquire the attribute item name list from the GW 900.

The verifier terminal 700 includes a second VC storing unit 710, a second VC verifying unit 720, a verification result storing unit 730, a first VC storing unit 740, a first VC checking unit 750, and a check result storing unit 760. The second VC storing unit 710 stores the second VC 221 sent from the holder terminal 200. The second VC verifying unit 720 verifies the signature 222 attached to the second VC 221 according to verification procedures defined for the second DID infrastructure 40. The verification result storing unit 730 stores therein the verification results obtained by the second VC verifying unit 720.

The first VC storing unit 740 stores therein the first VC 211 sent from the holder terminal 200. The first VC checking unit 750 acquires a verifier list from one of the GWs 900a, 900b, and so on, and transmits a request for verifying the first VC 211 to verifiers on the acquired verifier list. The first VC checking unit 750 confirms, based on responses to the verification request, whether fraud has occurred in the issuance procedures of the second VC 221. The check result storing unit 760 stores therein the check results obtained by the first VC checking unit 750.

The GW 900a includes a first VC storing unit 910a, a first VC verifying unit 920a, a verification result storing unit 960a, and a verifier information storing unit 970a. The first VC storing unit 910a stores therein the first VC 211 included in the verification request from the verifier terminal 700. The first VC verifying unit 920a verifies the signature 212 attached to the first VC 211 according to the verification procedures defined for the first DID infrastructure 30. The verification result storing unit 960a stores therein verification results obtained by the first VC verifying unit 920a.

The verifier information storing unit 970a stores therein verifier information on an intermediary operator having the GW 900a capable of verifying VCs in the first DID infrastructure 30. The verifier information is, for example, a verification e-mail destination disclosed externally by the intermediary operator running the GW 900a. Other GWs 900b and so on and the verifier terminal 300 in the first DID infrastructure 30 also disclose their own verifier information. For example, the verifier terminal 700 is able to acquire the verifier information from each of the GWs 900a, 900b, and so on and the verifier terminal 300 and generate a verifier list of verifiers or intermediary operators having devices capable of verifying VCs in the first DID infrastructure 30.

Note that other GWs 900a, 900b, and so on are also provided with the same functions as those of the GW 900. Similarly, other GWs 900, 900b, and so on are also provided with the same functions as those of the GW 900a.

It is noted that the solid lines interconnecting functional blocks in FIG. 8 represent only some of their communication paths. A person skilled in the art would appreciate that there may be other communication paths in actual implementations. Each functional block seen in FIG. 8 may be implemented as a program module so that a computer executes the program module to provide its encoded functions.

FIG. 9 illustrates an example of a verifier list. In a verifier list 971, the service name of each verifier who verifies VCs in the first DID infrastructure 30 is registered in association with, for example, a second DID infrastructure-dedicated DID and an email destination. Each second DID infrastructure-dedicated DID is the identification information of a device (e.g., a GW or verifier terminal), used within the second DID infrastructure 40, in the case where the device also belongs to the second DID infrastructure 40. Each email destination is an email address to which a request for verifying the first VC using the associated service is transmitted. Note that the verifier list 971 also includes information on services which do not belong to the second DID infrastructure 40.

In the system configured as described above, when the holder 31 in the first DID infrastructure 30 wants to prove the validity of their attribute information to the verifier 42 in the second DID infrastructure 40, a VC reissuance request is sent to the GW 900 from the holder terminal 200 under the instruction of the holder 31. Subsequently, the GW 900 performs a VC reissuing process. The VC reissuing process is described in detail below with reference to FIGS. 10 and 11.

Figure 10:
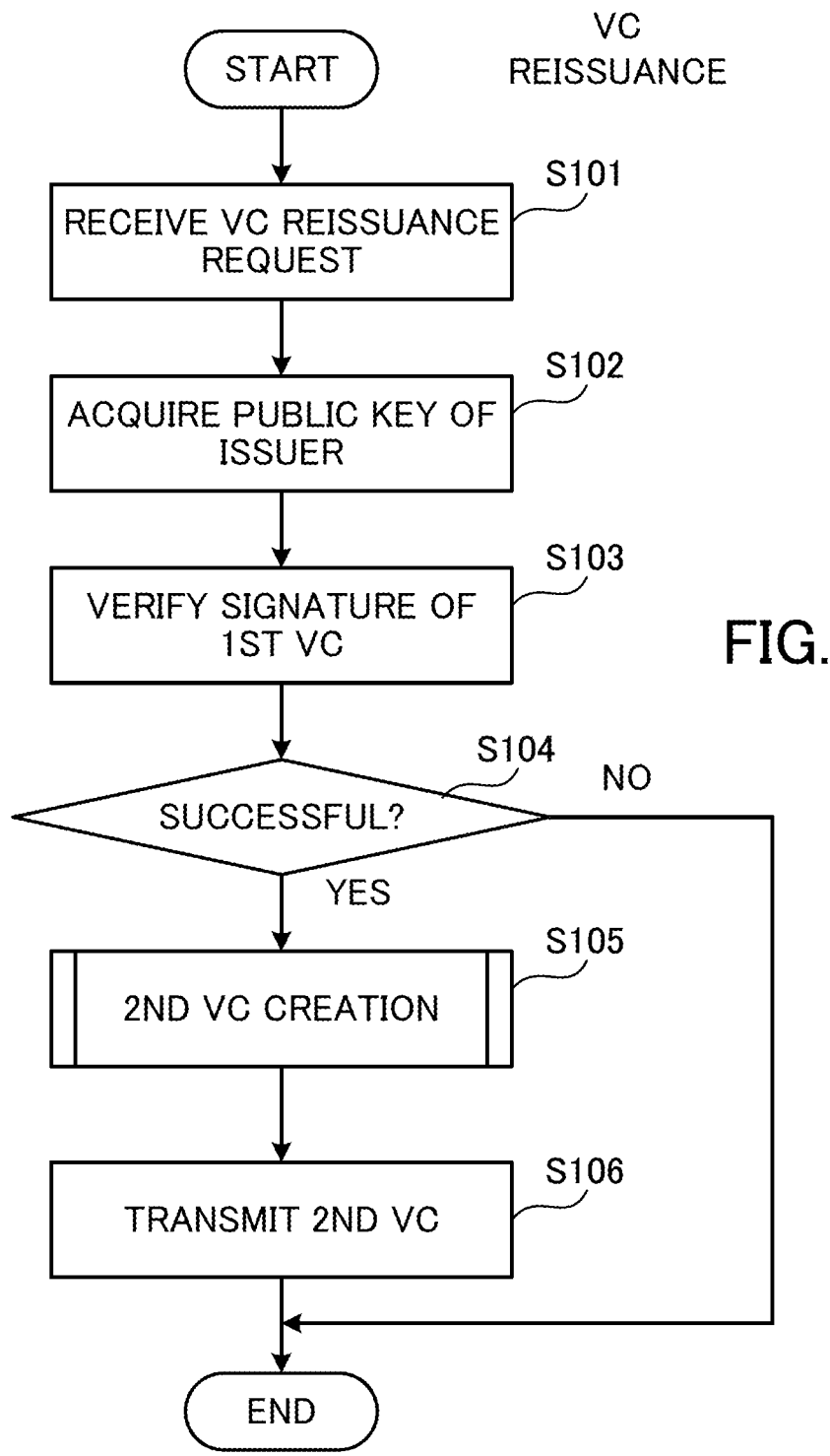
FIG. 10 is a flowchart illustrating an example of procedures of a VC reissuing process.

FIG. 10 is a flowchart illustrating an example of procedures of a VC reissuing process. The process in FIG. 10 is described below in the order of step numbers.

[Step S101] The GW 900 receives a VC reissuance request from the holder terminal 200. The VC reissuance request includes the first VC 211. The GW 900 stores, in the first VC storing unit 910, the first VC 211 included in the VC reissuance request.

[Step S102] The first VC verifying unit 920 acquires the public key 112 of the issuer. For example, the first VC verifying unit 920 queries the decentralized PKI system 400 in the first DID infrastructure 30 for the key of the issuer. In response to the query, the public key 112 of the issuer is returned from the decentralized PKI system 400.

[Step S103] The first VC verifying unit 920 verifies the signature 212 of the first VC 211 using the acquired public key 112.

[Step S104] The first VC verifying unit 920 determines whether the verification is successful. If the verification is successful, the first VC verifying unit 920 instructs the second VC creating unit 930 to create the second VC 221, and the process moves to step S105. If the verification is unsuccessful, the first VC verifying unit 920 terminates the VC reissuing process with an error.

[Step S105] The second VC creating unit 930 performs a second VC creating process. This process is described in detail later (see FIG. 11). The second VC 221 created by the second VC creating unit 930 is stored in the second VC storing unit 940.

[Step S106] The GW 900 transmits the second VC 221 stored in the second VC storing unit 940 to the holder terminal 200.

Next, the procedures of the second VC creating process are described in detail.

Figure 11:
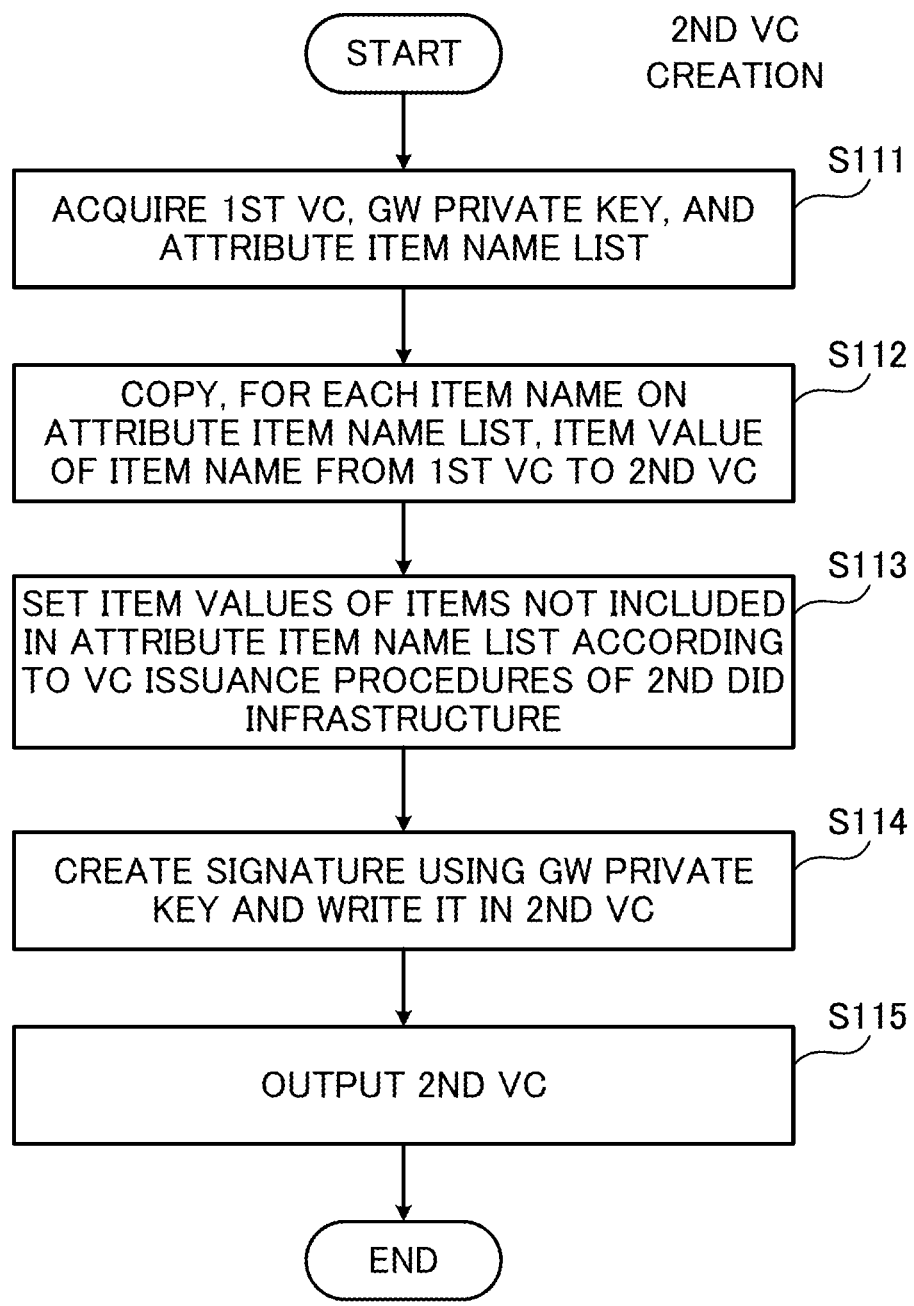
FIG. 11 is a flowchart illustrating an example of procedures of a second VC creating process.

FIG. 11 is a flowchart illustrating an example of procedures of a second VC creating process. The process in FIG. 11 is described below in the order of step numbers.

[Step S111] The second VC creating unit 930 acquires the first VC 211, the private key 901 of the GW 900, and the attribute item name list. The first VC 211 is obtained from the first VC verifying unit 920. The private key 901 of the GW 900 is obtained, for example, from a storage device within the GW 900. The attribute item name list is obtained from the issuer device 100.

[Step S112] For each item name on the attribute item name list, the second VC creating unit 930 copies the item value of the item name from the first VC 211 into the second VC 221. Herewith, the attribute information 214 of the first VC 211 is written as the attribute information 224 of the second VC 221.

[Step S113] The second VC creating unit 930 sets, in the second VC 221, the item values of item names not included in the attribute item name list according to the VC issuance procedures defined for the second DID infrastructure 40. Herewith, the non-attribute information 223 is written in the second VC 221.

[Step S114] The second VC creating unit 930 creates the signature 222 of the attribute information 224 using the private key 901 of the GW 900 according to signature creation procedures defined for the second DID infrastructure 40. The second VC creating unit 930 writes the created signature 222 in the second VC 221.

[Step S115] The second VC creating unit 930 outputs the created second VC 221. For example, the second VC creating unit 930 stores the second VC 221 in the second VC storing unit 940.

By the above-described reissuing process, the second VC 221 is issued based on the first VC 211. The second VC 221 is managed in the second wallet 220 of the holder terminal 200. Then, the holder terminal 200 transmits the first VC 211 and the second VC 221 to the verifier terminal 700 under the instruction of the holder 31. For example, the verifier terminal 700 presents a destination as a two-dimensional code or the like. The holder 31 inputs information of the destination into the holder terminal 200 and enters an instruction to transmit the first VC 211 and the second VC 221. For example, if the destination is presented as a two-dimensional code, the holder 31 causes a camera of the holder terminal 200 to read the two-dimensional code to input the information of the destination into the holder terminal 200. The holder terminal 200 transmits the first VC 211 and the second VC 221 to the entered destination. Upon receiving the first VC 211 and the second VC 221, the verifier terminal 700 performs a verifying process for the second VC 221.

Figure 12:
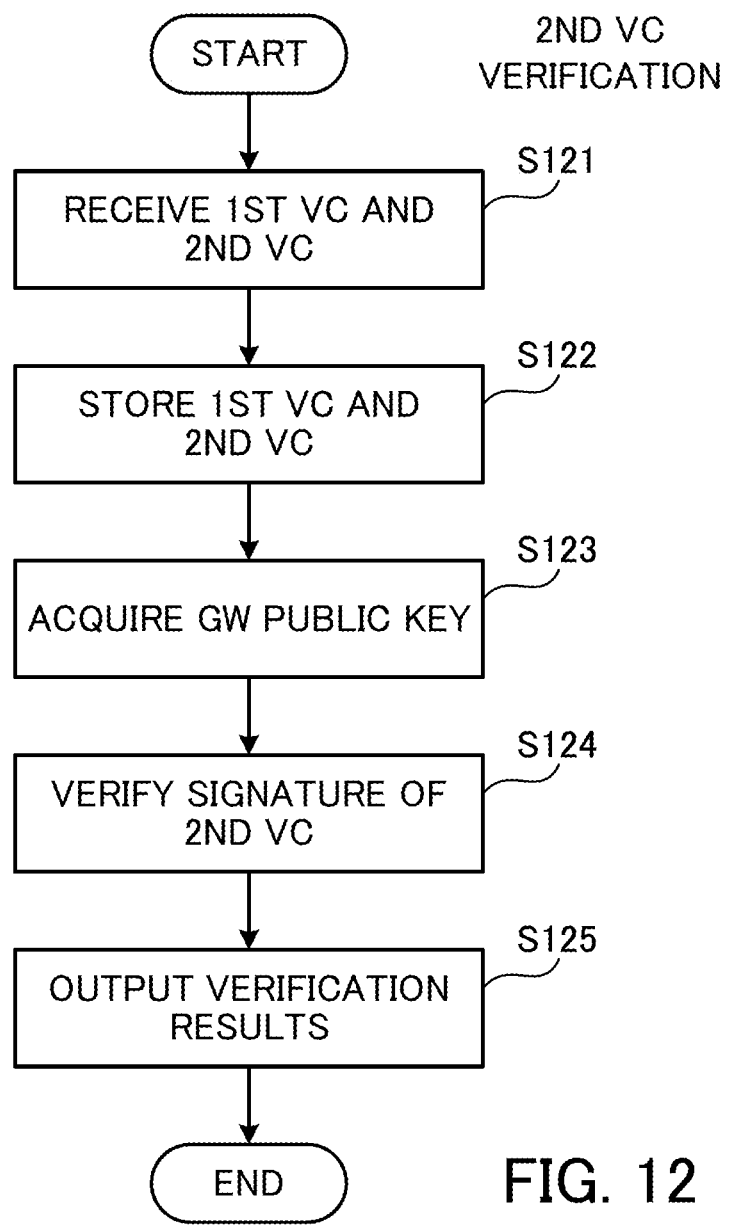
FIG. 12 is a flowchart illustrating an example of procedures of a second VC verifying process.

FIG. 12 is a flowchart illustrating an example of procedures of a second VC verifying process. The process in FIG. 12 is described below in the order of step numbers.

[Step S121] The verifier terminal 700 receives the first VC 211 and the second VC 221 from the holder terminal 200.

[Step S122] The verifier terminal 700 stores the first VC 211 in the first VC storing unit 740 and the second VC 221 in the second VC storing unit 710.

[Step S123] The second VC verifying unit 720 of the verifier terminal 700 acquires the public key 902 of the GW 900. For example, the second VC verifying unit 720 queries the decentralized PKI system 800 in the second DID infrastructure 40 for the key of the GW 900. In response to the query, the public key 902 of the GW 900 is returned from the decentralized PKI system 800.

[Step S124] The second VC verifying unit 720 verifies the signature 222 of the second VC 221 using the acquired public key 902.

[Step S125] The second VC verifying unit 720 outputs the verification results. For example, the second VC verifying unit 720 stores the verification results in the verification result storing unit 730.

The verifier 42 causes the verifier terminal 700 to display the verification results stored in the verification result storing unit 730 to thereby recognize the verification results. If the verification results indicate "Valid", the verifier 42 determines that the contents of the attribute information 224 in the second VC 221 correctly represent attributes of the holder 31.

Even if "Valid" is obtained as the verification results in the verifying process of the second VC 221, there is a possibility that a fraudulent act has been committed on the GW 900 and, therefore, the contents of the attribute information 224 differ from the original attributes of the holder 31. For example, when a fraudulent act on the GW 900 is suspected, the verifier 42 is able to check for the existence or nonexistence of fraud using the first VC 211. In that case, the verifier 42 enters an instruction to check the first VC 211 on the verifier terminal 700. In response, the verifier terminal 700 performs a first VC checking process.

Figure 13:
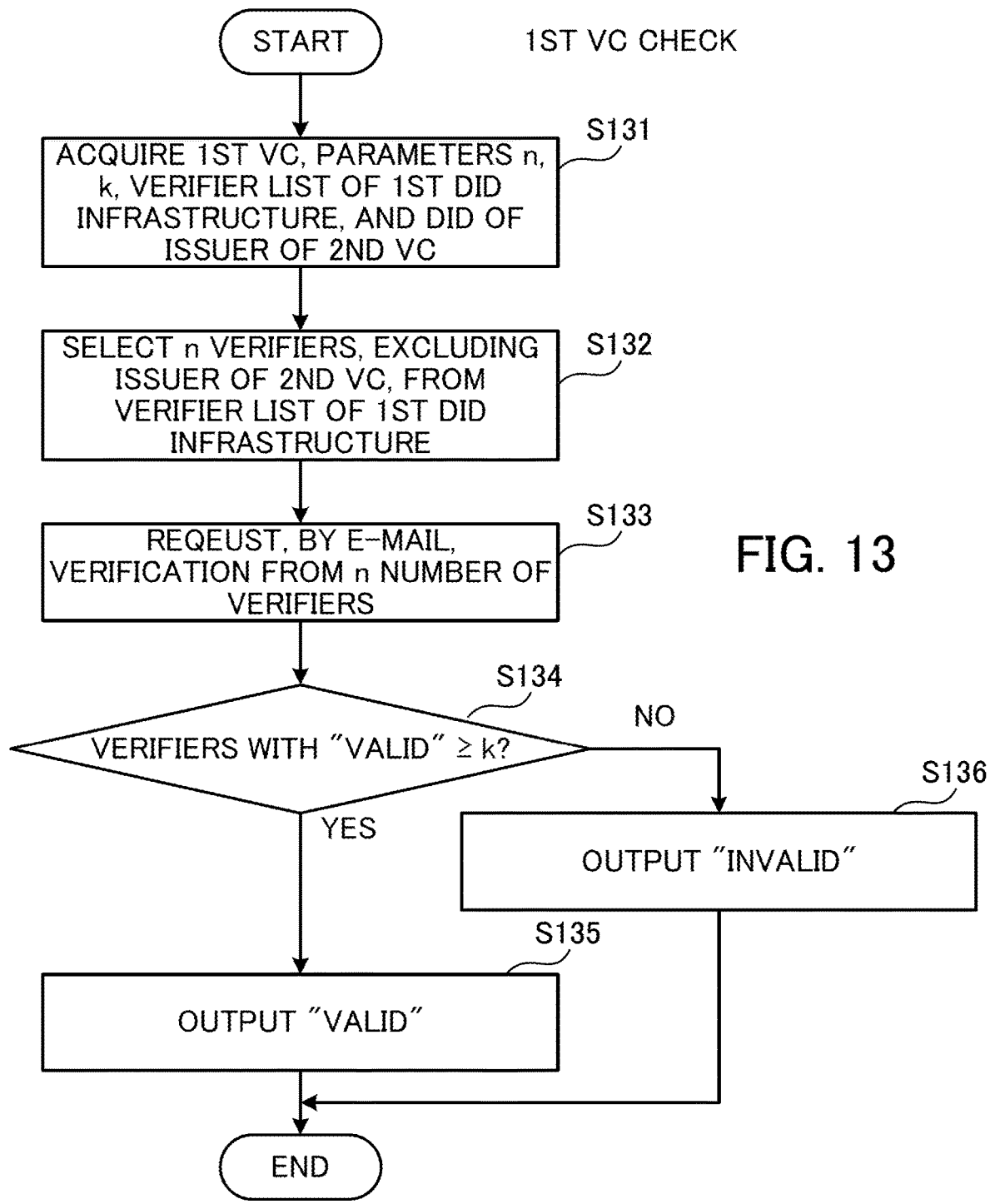
FIG. 13 is a flowchart illustrating an example of procedures of a first VC checking process.

FIG. 13 is a flowchart illustrating an example of procedures of a first VC checking process. The process in FIG. 13 is described below in the order of step numbers.

[Step S131] The first VC checking unit 750 acquires the first VC 211, parameters n and k, the verifier list 971 of the first DID infrastructure 30, and the DID of the issuer (the GW 900) of the second VC 221. The first VC 211 is obtained from the first VC storing unit 740. The parameters n and k are integers set in the verifier terminal 700 in advance. The parameter n indicates the number of destinations for a verification request. The parameter k is a threshold indicating how many responses of "Valid" need to be received from the n number of request destinations to set the check results as "Valid". The verifier list 971 is obtained from, for example, the GW 900a. The DID of the issuer of the second VC 221 is indicated, for example, in the non-attribute information 223 of the second VC 221.

[Step S132] The first VC checking unit 750 selects, from the verifier list 971 with verifiers belonging to the first DID infrastructure 30, n number of verifiers to whom a verification request is to be made (including intermediary operators running GWs). The n number of verifiers may be selected under the instruction of the holder terminal 200. In selecting the n number of verifiers to be requested for verification, the first VC checking unit 750 excludes the issuer of the second VC 221 from the selection. For example, in the second VC 221, the DID of the GW 900 having issued the second VC 221 is set as the item value of the item name "issuer". Amongst the verifiers registered in the verifier list 971, the first VC checking unit 750 excludes, from the selection, a verifier whose DID set under "second DID infrastructure-dedicated DID" is the same as the DID of the GW 900.

[Step S133] The first VC checking unit 750 transmits a verification request by e-mail to the selected n number of verifiers, who belong to the first DID infrastructure 30. The verification request e-mail is accompanied by the first VC 211. Upon checking the e-mail, for example, the verifiers input, as a verification subject, the first VC 211 attached to the e-mail into their verification devices, e.g., the GWs 900a, 900b, and so on. That is, the verification request sent by e-mail is passed to the verification devices at the end. Thereafter, the first VC checking unit 750 receives the verification results from the verification device (verification terminal or GW) of each verifier to whom the verification request has been sent.

[Step S134] The first VC checking unit 750 determines whether k or more number of verifiers have returned "Valid". If k or more number of verifiers have returned "Valid", the first VC checking unit 750 moves to step S135.

If the number of verifiers having returned "Valid" is less than k, the first VC checking unit 750 moves to step S136.

[Step S135] The first VC checking unit 750 outputs "Valid" as the check results. For example, the first VC checking unit 750 stores the check results "Valid" in the check result storing unit 760. Subsequently, the first VC checking unit 750 ends the first VC checking process.

[Step S136] The first VC checking unit 750 outputs "Invalid" as the check results. For example, the first VC checking unit 750 stores the check results "Invalid" in the check result storing unit 760.

With reference to the check results stored in the check result storing unit 760, the verifier 42 determines the existence or nonexistence of fraud. If the check results are "Valid", the verifier 42 determines that no fraud has been committed. If the check results are "Invalid", the verifier 42 determines that there has been a fraudulent act.

As has been described above, in proving the validity of their own attribute information to the verifier 42 of the second DID infrastructure 40, the holder 31 sends not only the second VC 221 with a replaced signature, but also the first VC 211, from the holder terminal 200 to the verifier terminal 700. Herewith, when the GW 900 in charge of the signature replacement has wrongly issued the signature, the verifier 42 verifies the signature 212 of the first VC 211 to thereby confirm that fraud has been committed. That is, it facilitates detection of fraud on the GW 900, which is expected to contribute to deterring fraudulent acts on the GW 900.

For example, when there is some distrust for the operation of the GW 900, the verifier 42 requests verification of the signature 212 from verifiers' devices (e.g., 900a, 900b, and so on) belonging to the first DID infrastructure 30, other than the GW 900, to thereby check for the legitimacy of the operation of the GW 900. At this time, for example, the verifier 42 requests verification of the signature 212 from multiple verifiers, and then confirms the validity of the signature 212 based on unanimous or majority verification results. In this manner, the verifier 42 is able to correctly determine the existence or nonexistence of fraud.

Note that, in selecting verifiers of the first DID infrastructure 30 to check for the existence of fraud, it is desirable to select the verifiers discretely such that there would be no collusion between them. For example, the verifier list 971 is acquired from a device (e.g., the GW 900a) different from the GW 900 having conducted signature replacement. This prevents interference with verifiers on the verifier list 971 from the intermediary operator running the GW 900.

Note that the above-described process of checking for the existence of fraud (the first VC checking process) is provided only for securing verification means for deterring fraudulent acts on the GW 900. That is, whether the verifier 42 causes the verifier terminal 700 to run the process of checking for the existence of fraud is decided on a voluntary basis.

(c) Third Embodiment

The third embodiment is directed to also enabling determination of the existence or nonexistence of fraud committed by the holder 31. That is, the second embodiment does not take into account fraudulent acts done by the holder 31, and even if the process of checking the first VC 211 results in "Invalid", it is not possible to see whether fraud has been made on the GW 900 or by the holder 31. For example, even if the holder 31 has falsified the signature 212 of the first VC 211 and the check results for the first VC 211 obtained by the verifier terminal 700 therefore indicate "Invalid", the verifier 42 is not able to distinguish it from the case where fraud has been committed on the GW 900.

The second embodiment also needs preparation of communication channels and processing components for transmitting the first VC 211 and the second VC 221 to the verifier terminal 700.

In view of the above, the third embodiment aims at allowing for distinction between fraud made on the GW 900 and fraud made by the holder 31 and also eliminating the need for a special mechanism for transmitting information from the holder terminal 200 to the verifier terminal 700. The following description of the third embodiment focuses on differences from the above-described second embodiment.

Figure 14:
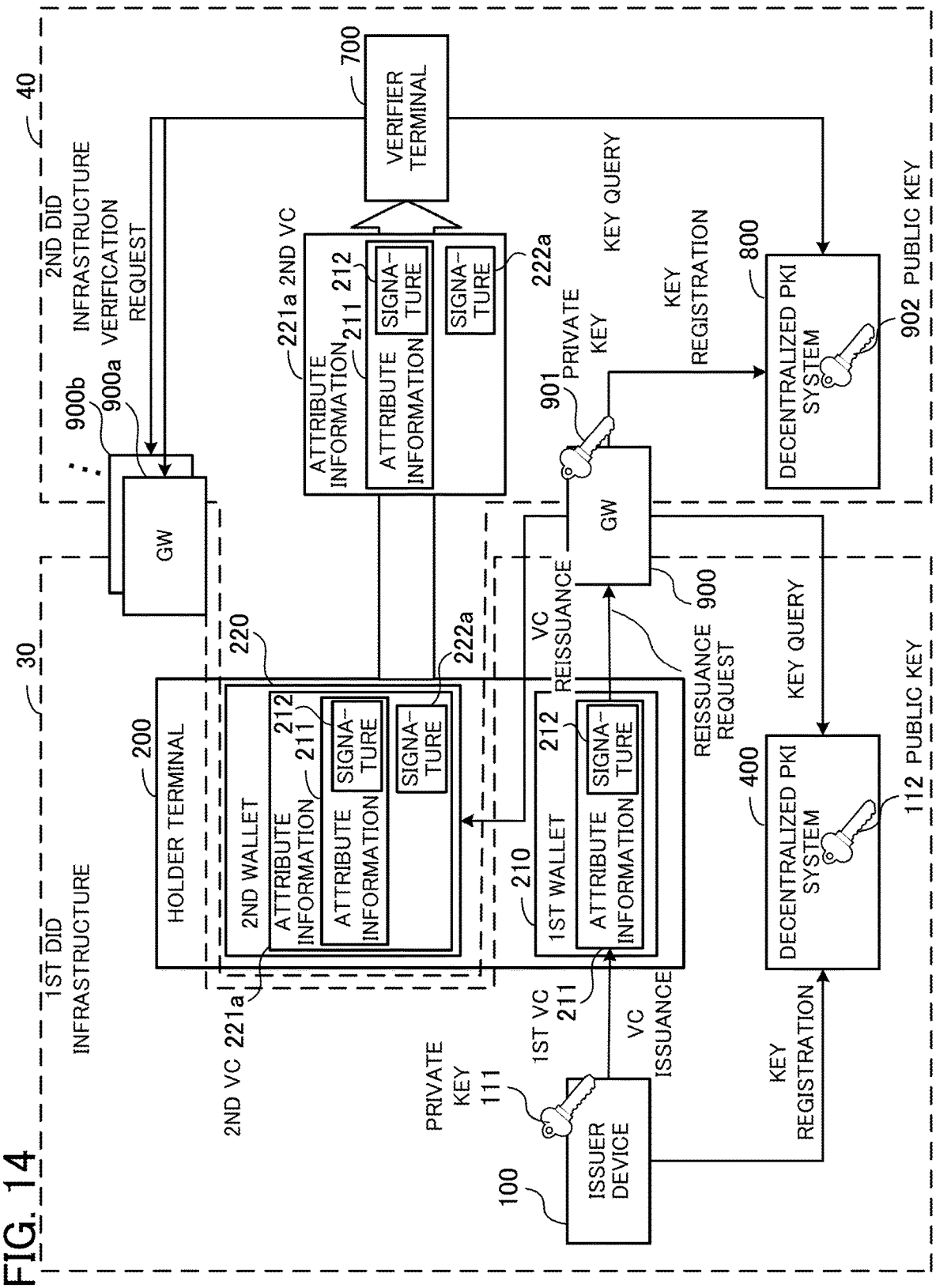
FIG. 14 illustrates an example of a signature replacement method according to a third embodiment.

FIG. 14 illustrates an example of a signature replacement method according to the third embodiment. In FIG. 14, the processes up to transmitting a VC reissuance request from the holder terminal 200 to the GW 900 are the same as those in the second embodiment. In the third embodiment, upon reception of the VC reissuance request, the GW 900 verifies the signature 212 of the first VC 211 and then adds a signature 222a of the GW 900 to information including the first VC 211 to thereby generate a second VC 221a. For example, the second VC 221a includes the attribute information of the holder 31, the first VC 211, and the signature 222a. The GW 900 transmits the generated second VC 221a to the holder terminal 200. The VC reissuance is made in this manner.

The holder terminal 200 manages the second VC 221a in the second wallet 220. Then, when the holder 31 wants to prove their own attribute information to the verifier 42, the holder terminal 200 transmits the second VC 221a managed in the second wallet 220 to the verifier terminal 700.

Upon reception of the second VC 221a, the verifier terminal 700 acquires the public key 902 of the GW 900 from the decentralized PKI system 800 in the second DID infrastructure 40. Then, the verifier terminal 700 verifies the signature 222a of the second VC 221a using the acquired public key 902. If the signature 222a is valid, the verifier 42 determines that the attribute information of the holder 31 on the second VC 221a is correct. If having any doubts about the operation of the GW 900, the verifier 42 instructs the verifier terminal 700 to run the process of checking the first VC 211. In response, the verifier terminal 700 transmits a verification request to devices (or verifiers having the devices) capable of VC verification in the first DID infrastructure 30, such as the GWs 900a, 900b and so on. Based on verification results returned in response to the verification request, the verifier terminal 700 determines whether the first VC 211 is valid.

Figure 15:
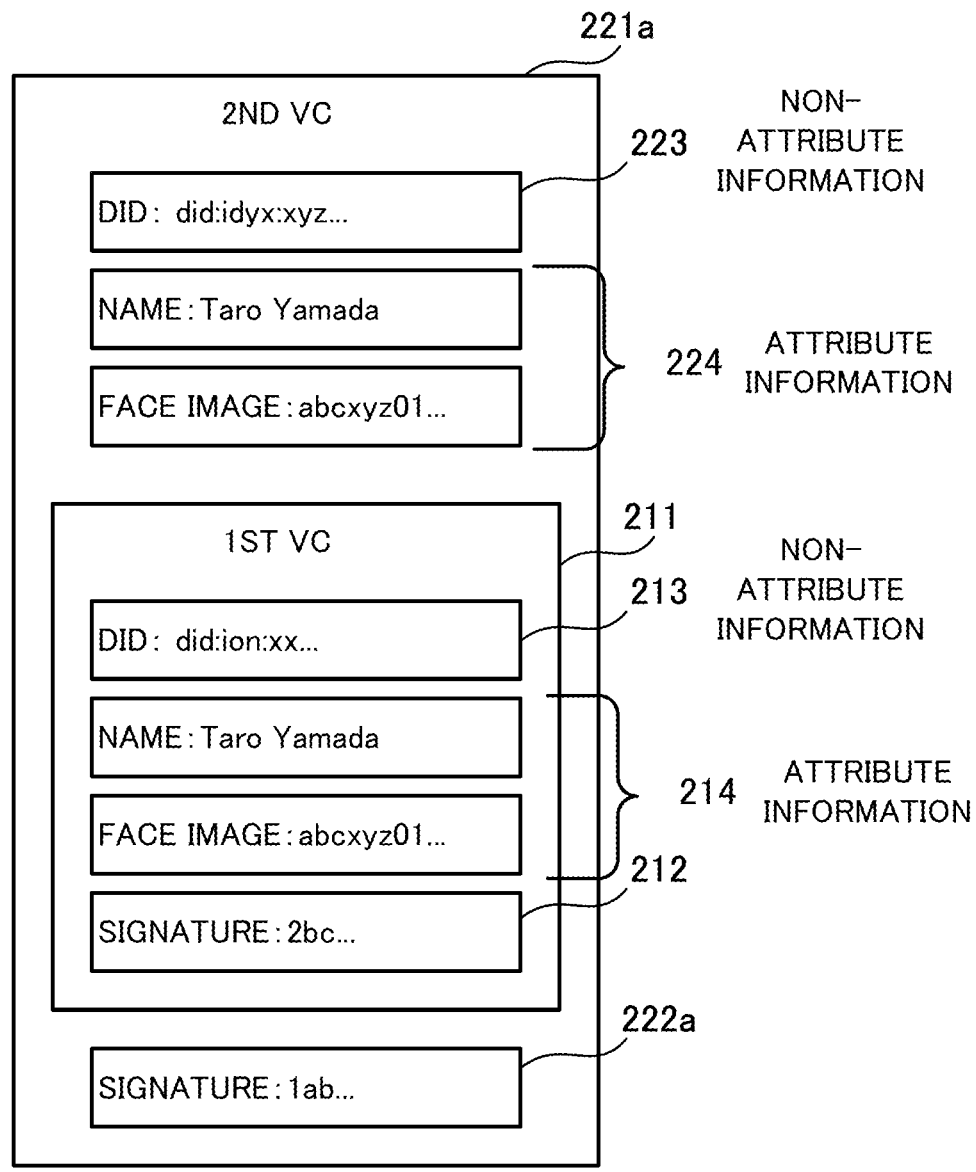
FIG. 15 illustrates an example of the second VC containing the first VC.

FIG. 15 illustrates an example of a second VC containing a first VC. The second VC 221a includes the non-attribute information 223, the attribute information 224, the first VC 211, and the signature 222a. The first VC 211 includes the non-attribute information 213, the attribute information 214, and the signature 212. The signature 222a of the second VC 221a is a signature for certifying the contents of the non-attribute information 223, the attribute information 224, and the first VC 211.

This makes it possible to reliably detect fraud committed on the GW 900. For example, if the signature 222a of the second VC 221a is "Valid" and the signature 212 of the first VC 211 is "Invalid", a fraudulent act is found to have been done on the GW 900. If both the signature 222a of the second VC 221a and the signature 212 of the first VC 211 are "Invalid", the holder 31 is determined to have falsified the signature 212 of the first VC 211.

The GW 900 reissues the second VC 221a (including the non-attribute information 213, the attribute information 224, the first VC 211, and the signature 222a) with the original first VC 211 (including the non-attribute information 213, the attribute information 214, and the signature 212) embedded therein. This allows for management of the first VC 211 in the second wallet 220. It also becomes possible to send the first VC 211 using an existing communication mechanism between the second wallet 220 and the verifier terminal 700, specified in the second DID infrastructure 40. This eliminates the need for adding a processing component used to send the first VC 211 from the holder terminal 200 to the verifier terminal 700.

Next described are functions of the individual devices for realizing the processes depicted in FIG. 14.

Figure 16:
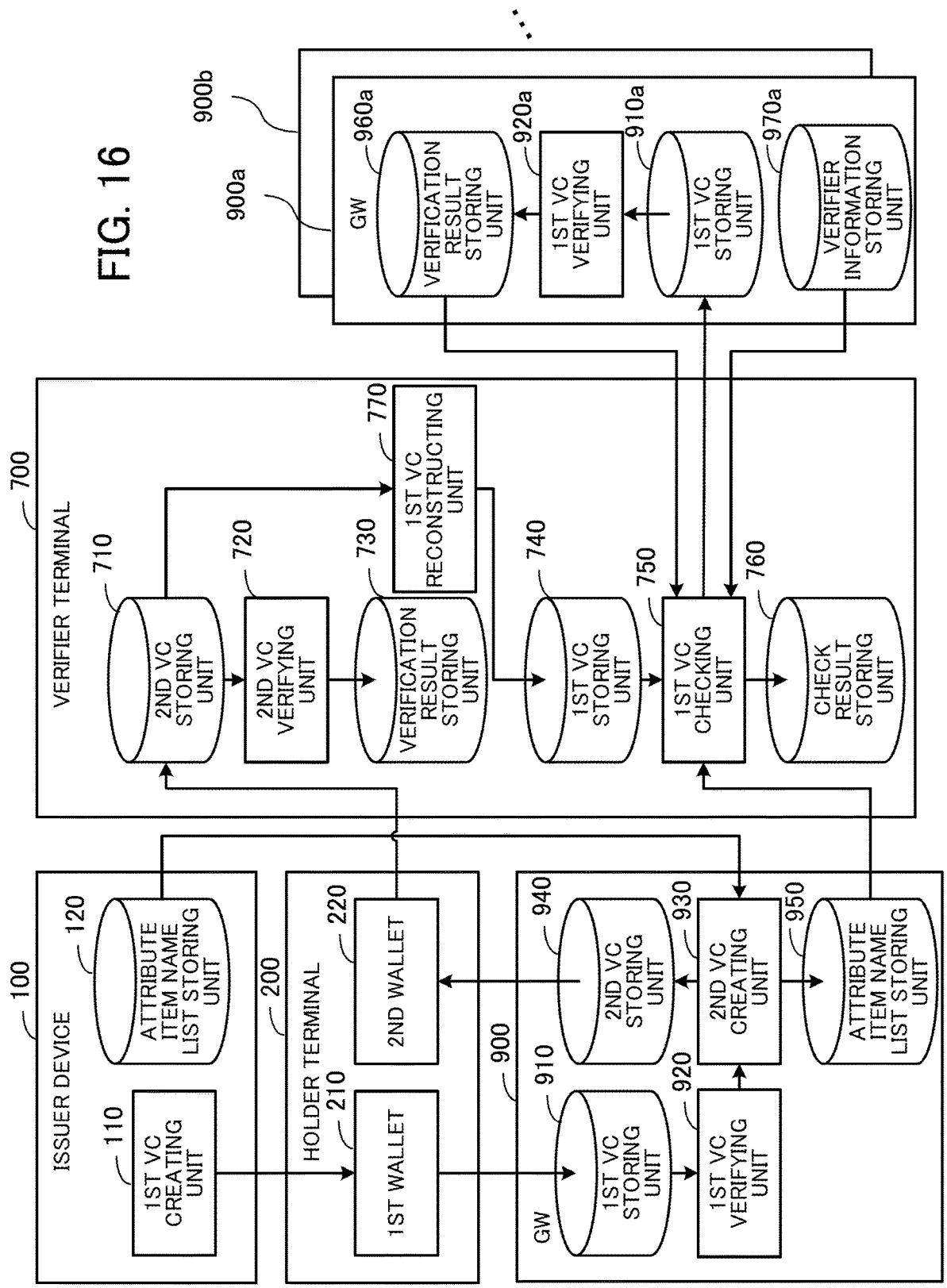
FIG. 16 is a block diagram illustrating an example of functions of each device according to the third embodiment.

FIG. 16 is a block diagram illustrating an example of functions of each device according to the third embodiment. The verifier terminal 700 of the third embodiment includes a first VC reconstructing unit 770 in addition to the components of the second embodiment (see FIG. 8). The third embodiment does not need the communication path used in the second embodiment to transmit the first VC 211 from the first wallet 210 of the holder terminal 200 to the verifier terminal 700. The first VC reconstructing unit 770 extracts the first VC 211 from the second VC 221a stored in the second VC storing unit 710. Then, the first VC reconstructing unit 770 stores the extracted first VC 211 in the first VC storing unit 740.

Each component of FIG. 16 has the same function as the component with the same name of the second embodiment depicted in FIG. 8. Note however that the second VC creating unit 930 of the third embodiment creates the second VC 221a containing the first VC 211 therein, unlike with the second embodiment.

Figure 17:
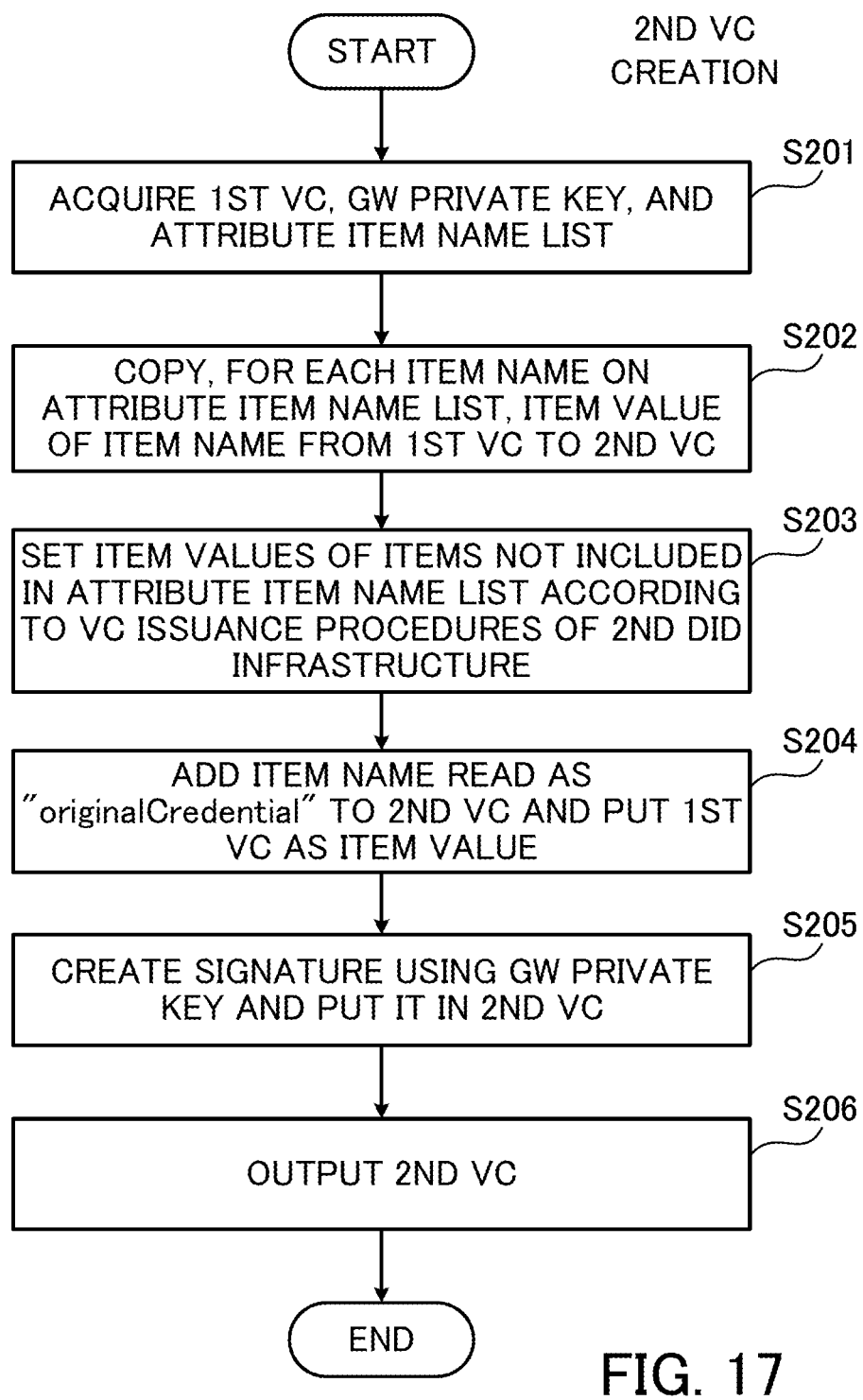
FIG. 17 is a flowchart illustrating an example of procedures of a second VC creating process according to the third embodiment.

FIG. 17 is a flowchart illustrating an example of procedures of a second VC creating process according to the third embodiment. The process in FIG. 17 is described below in the order of step numbers.

[Step S201] The second VC creating unit 930 acquires the first VC 211, the private key 901 of the GW 900, and the attribute item name list.

[Step S202] For each item name on the attribute item name list, the second VC creating unit 930 copies the item value of the item name from the first VC 211 into the second VC 221a.

[Step S203] The second VC creating unit 930 sets, in the second VC 221a, the item values of non-attribute information according to the VC issuance procedures defined for the second DID infrastructure 40.

[Step S204] The second VC creating unit 930 adds an item name read as "originalCredential" to the second VC 221a and enters the first VC 211 as it is as the item value of the added item name "originalCredential".

[Step S205] The second VC creating unit 930 creates the signature 222a for the attribute information 224 and the first VC 211 using the private key 901 of the GW 900 according to signature creation procedures defined for the second DID infrastructure 40. The second VC creating unit 930 puts the created signature 222a in the second VC 221a.

[Step S206] The second VC creating unit 930 outputs the created second VC 221a. For example, the second VC creating unit 930 stores the second VC 221a in the second VC storing unit 940.

The second VC 221a containing the first VC 211 therein is created in this manner.

FIG. 18 illustrates an example of a second VC containing a first VC. The example of FIG. 18 depicts the first VC 211 and the second VC 221*a* created using the Verifiable Credentials Data Model (VCDM) 1.0. In the second VC 221*a*, the item name "originalCredential" is included in the item name "credentialSubject", as illustrated in FIG. 18. "credentialSubject" is an item for setting information to be signed. The item value of the item name "originalCredential" includes the entire first VC 211. Because the item representing the first VC 211 is placed within "credentialSubject", the signature 222*a* is affixed to the information including the first VC 211.

The second VC 221*a* complies with the specifications of the second DID infrastructure 40 and is manageable in the second wallet 220. The second wallet 220 is able to send the second VC 221*a* containing the first VC 211 therein to the verifier terminal 700 in the second DID infrastructure 40 using a communication method specified in the second DID infrastructure 40. In the verifier terminal 700, the first VC reconstructing unit 770 extracts the first VC 211 from the received second VC 221*a*.

Figure 19:
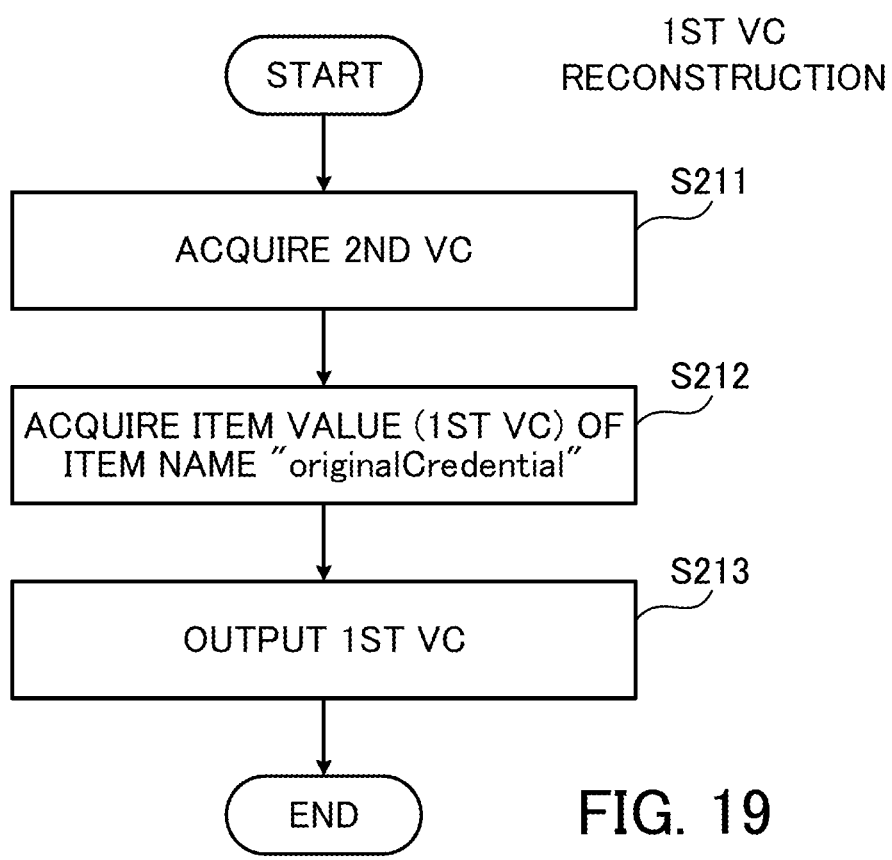
FIG. 19 is a flowchart illustrating an example of procedures of a first VC reconstructing process.

FIG. 19 is a flowchart illustrating an example of procedures of a first VC reconstructing process. The process in FIG. 19 is described below in the order of step numbers.

[Step S211] The first VC reconstructing unit 770 acquires the second VC 221*a* from the second VC storing unit 710.

[Step S212] The first VC reconstructing unit 770 acquires the item value of the item name "originalCredential" of the second VC 221*a*. The acquired item value represents the first VC 211.

[Step S213] The first VC reconstructing unit 770 outputs the first VC 211. For example, the first VC reconstructing unit 770 stores the first VC 211 in the first VC storing unit 740.

In this way, the first VC 211 is handed over to the verifier terminal 700 using the existing communication system of the second DID infrastructure 40. Then, whether a fraudulent act has taken place on the GW 900 is correctly determined using the first VC 211.

(d) Fourth Embodiment

The fourth embodiment is directed to reducing the data amount of the second VC of the third embodiment. In the second and third embodiments, the amount of data transmitted from the holder terminal 200 to the verifier terminal 700 increases by the amount of data in the first VC 211. The first VC 211 may contain a large amount of data, such as a face image. If the amount of data transmitted from the holder terminal 200 to the verifier terminal 700 is too large, it causes a processing delay for the holder 31 in proving their own attribute information. In view of this, the fourth embodiment aims at deleting, amongst the items included in the attribute information 214 of the first VC 211, items overlapping with those in the attribute information 224 of the second VC 221*a*.

Figure 20:
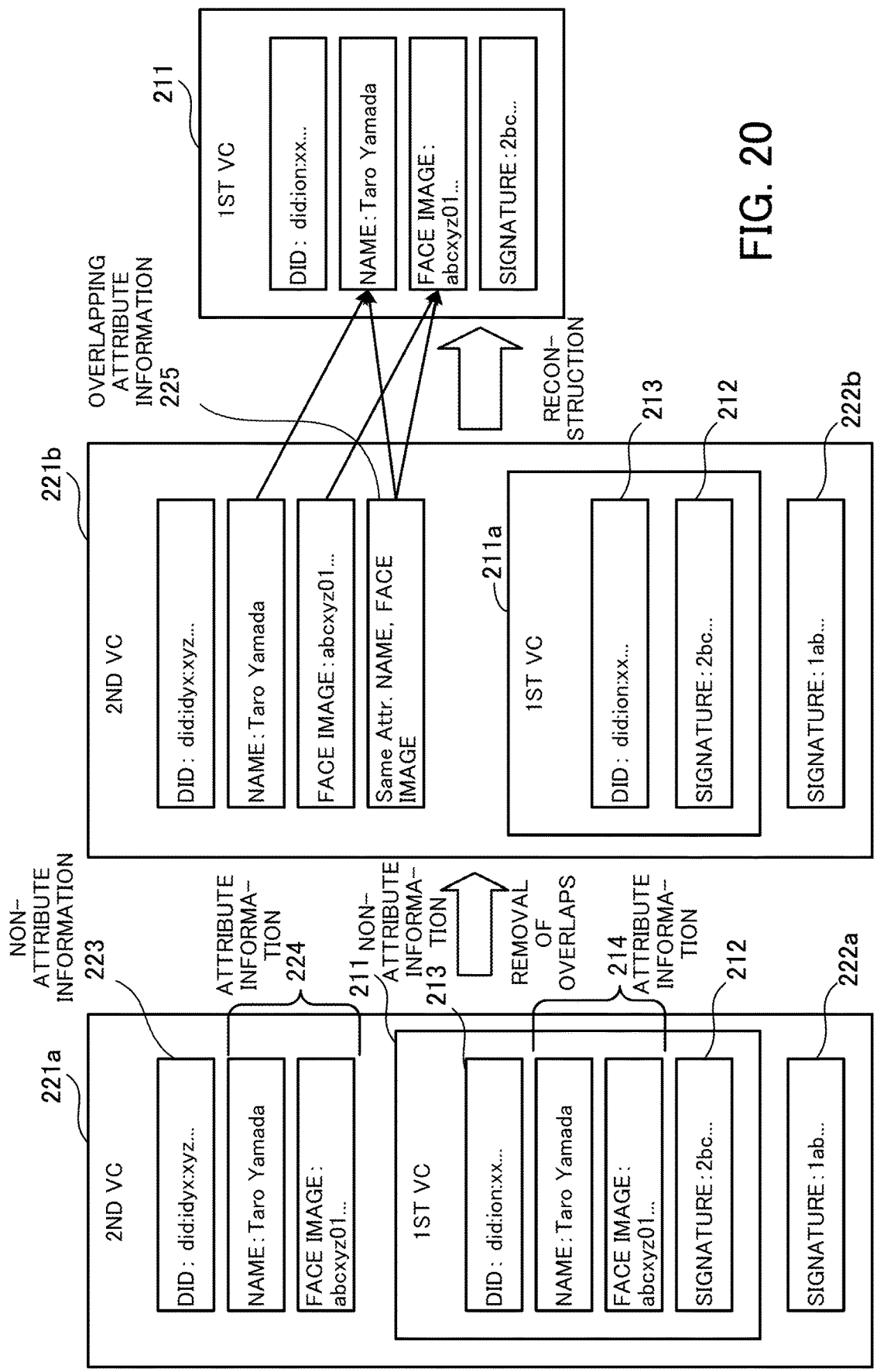
FIG. 20 illustrates a first example of a method of reducing the amount of data in the second VC.

FIG. 20 illustrates a first example of a method of reducing the amount of data in the second VC. In the example of FIG. 20, amongst the items included in the attribute information 214 of the first VC 211, "name" and "face image" are redundantly included in the attribute information 224 of the second VC 221*a*. Note here that each item whose item name and item value match between the first VC 211 and the second VC 221*a* is identified as an overlapping item.

In the fourth embodiment, the second VC creating unit 930 creates, based on the second VC 221*a* depicted in the third embodiment, a second VC 221*b* from which overlapping items have been deleted. For example, overlapping attribute information 225 is set in the second VC 221*b* as a new item. The item name of the overlapping attribute information 225 is, for example, "Same Attr.". The item value of the overlapping attribute information 225 is set to the item name of each item that is redundantly included in the attribute information 214 of the first VC 211 and the attribute information 224 of the second VC 221*a*. The second VC 221*b* also includes the first VC 211*a* from which overlapping items have been deleted. In the example of FIG. 20, the first VC 211*a* is obtained by deleting the items "name" and "face image" from the first VC 211.

The second VC 221*b* from which overlapping items have thus been deleted is transmitted from the holder terminal 200 to the verifier terminal 700. The verifier terminal 700 is able to reconstruct the original first VC 211 by referring to the overlapping attribute information 225. For example, the verifier terminal 700 acquires items indicated by the overlapping attribute information 225 from the attribute information 224 of the second VC 221*b* and adds them to the first VC 211*a* included in the second VC 221*b* to thereby create the original first VC 211.

As described above, utilizing the fact that the attribute information 224, such as a name and face image, is copied to the second VC 221*a* without being changed on the GW 900, the fourth embodiment removes items overlapping with those of the second VC 221*a* from the first VC 211*a* contained in the second VC 221*b* to be created. This reduces not only the amount of data of the second VC 221*b* managed in the second wallet 220 but also the amount of data communicated between the second wallet 220 and the verifier terminal 700. Note that the second VC 221*b* is provided with the overlapping attribute information 225, which facilitates reconstruction of the original first VC 211.

Next, the process of creating the second VC 221*b* with overlapping items removed therefrom is described in detail with reference to FIG. 21.

Figure 21:
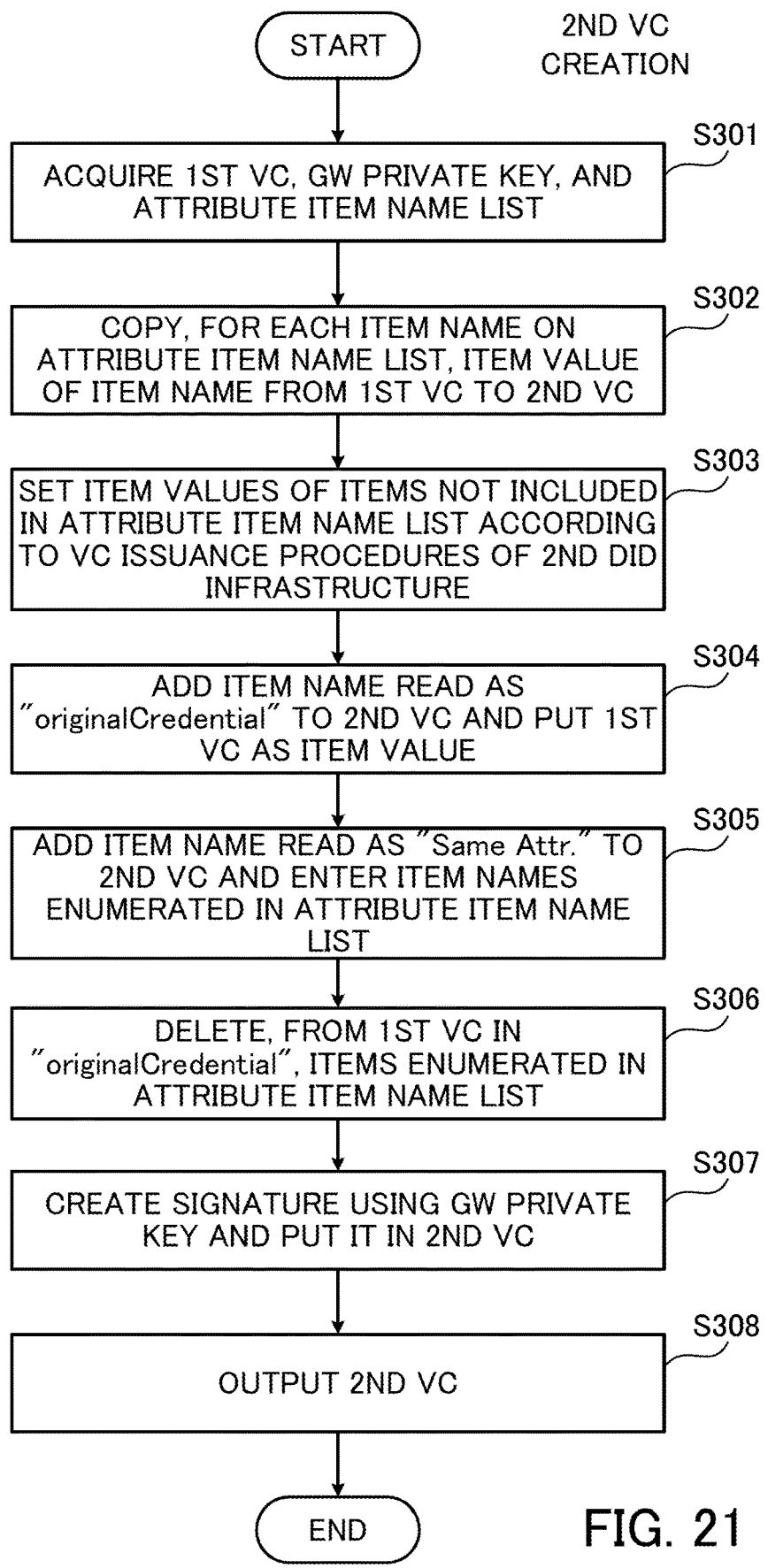
FIG. 21 is a flowchart illustrating an example of procedures of a second VC creating process according to a fourth embodiment.

FIG. 21 is a flowchart illustrating an example of procedures of a second VC creating process according to the fourth embodiment. Note that, amongst the process steps of FIG. 21, steps S301 to 304, S307, and S308 are the same as steps S201 to S206, respectively, in the third embodiment depicted in FIG. 17. Therefore, with reference to FIG. 21, the following describes steps different from those of the third embodiment, i.e., steps S305 and S306.

[Step S305] The second VC creating unit 930 adds an item name read as "Same Attr." to the second VC 221*b* and enters, as an item value corresponding to the added item name, item names enumerated in the attribute item name list.

[Step S306] The second VC creating unit 930 deletes items corresponding to the item names enumerated in the attribute item name list from the first VC set as the item value of the item name "originalCredential".

Thus, interposing steps S305 and S306 in the second VC creating process allows for creating the second VC 221*b* with overlapping items removed therefrom. Next, the process of reconstructing the first VC 211 from the second VC 221*b* is described in detail with reference to FIG. 22.

Figure 22:
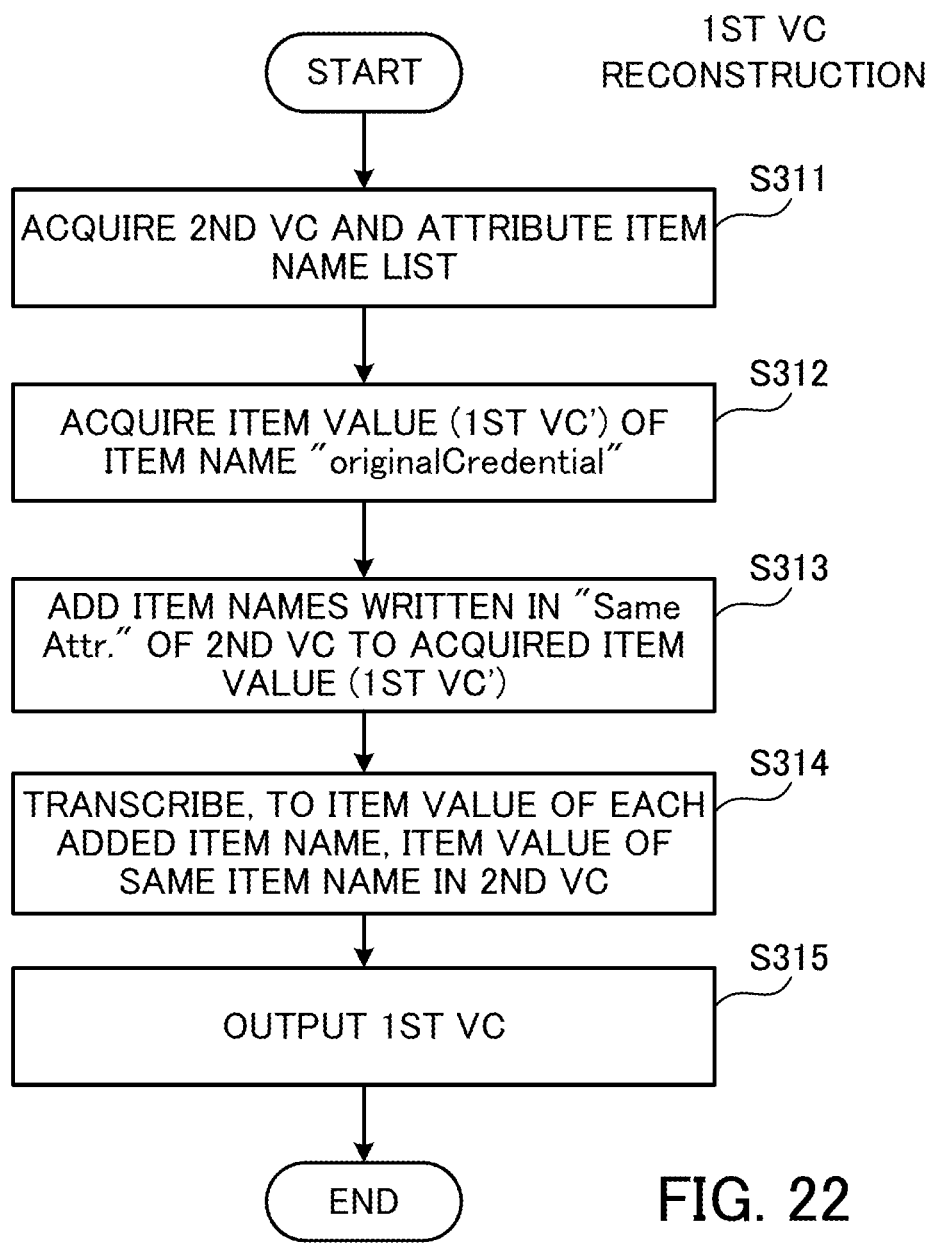
FIG. 22 is a flowchart illustrating an example of procedures of a first VC reconstructing process according to the fourth embodiment.

FIG. 22 is a flowchart illustrating an example of procedures of a first VC reconstructing process according to the fourth embodiment. The process in FIG. 22 is described below in the order of step numbers.

[Step S311] The first VC reconstructing unit 770 acquires the second VC 221*b* and the attribute item name list. For example, the first VC reconstructing unit 770 acquires the second VC 221*b* from the second VC storing unit 710. The first VC reconstructing unit 770 also acquires the attribute item name list from the attribute item name list storing unit 950 of the GW 900.

[Step S312] The first VC reconstructing unit 770 acquires the item value of the item name "originalCredential" of the second VC 221b. The first VC reconstructing unit 770 sets the acquired item value as a first VC'.

[Step S313] The first VC reconstructing unit 770 adds item names written as the item value of the item name "Same Attr." in the second VC 221b to the acquired item value (the first VC').

[Step S314] For each of the item names added to the first VC', the first VC reconstructing unit 770 transcribes the item value of the same item name in the second VC 221b. The first VC' obtained after transcription of the item values is the reconstructed first VC 211.

[Step S315] The first VC reconstructing unit 770 outputs the reconstructed first VC 211.

Thus, the first VC 211 is reconstructed even from the second VC 221b with overlapping items removed therefrom.

(e) Fifth Embodiment

The fifth embodiment is directed to deleting overlapping items by a method different from that of the fourth embodiment. Specifically, according to the fifth embodiment, the non-attribute information 213 in the first VC 211 is set as an item of the second VC with information indicating that it is an item in the original VC.

Figure 23:
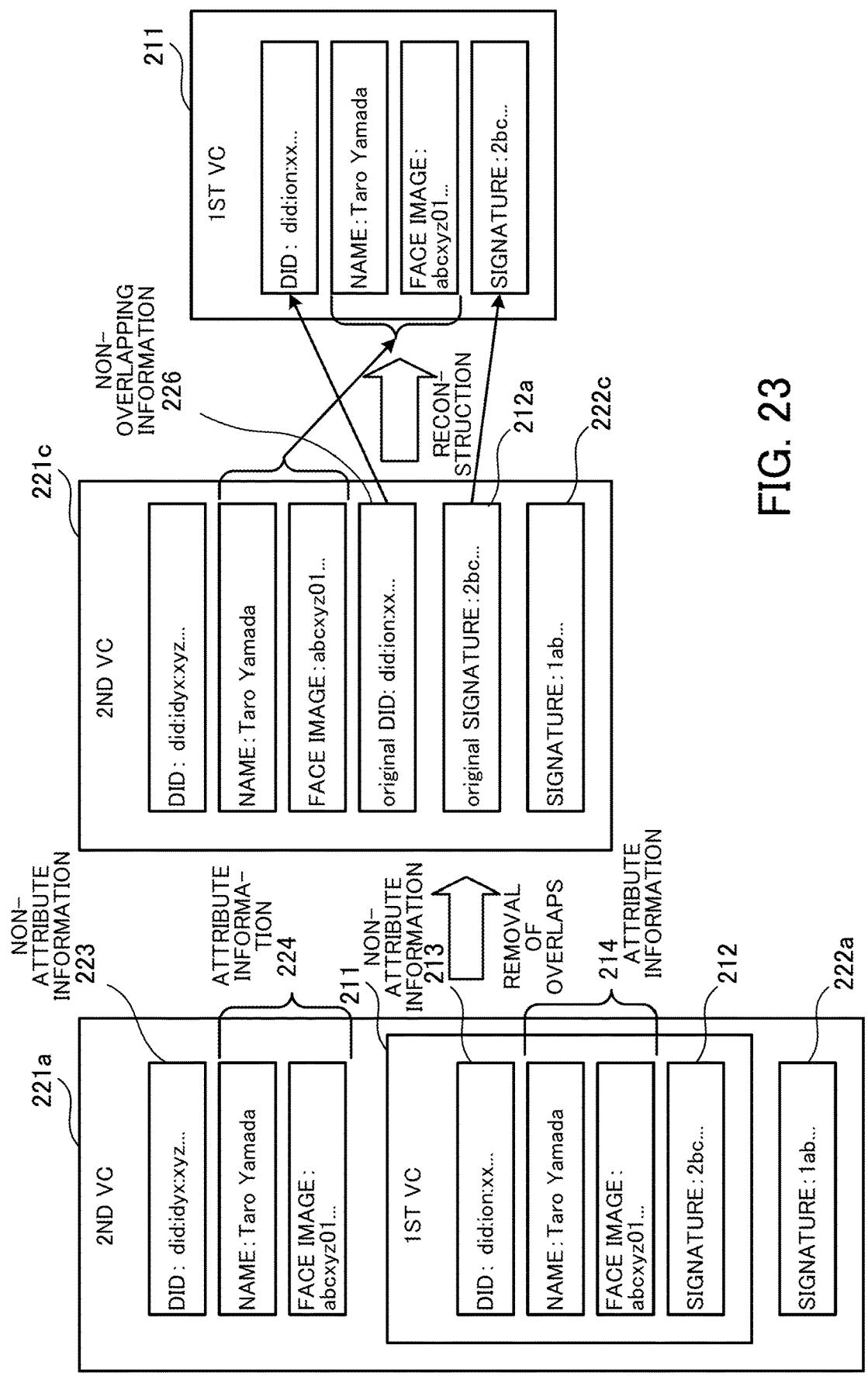
FIG. 23 illustrates a second example of a method of reducing the amount of data in the second VC.

FIG. 23 illustrates a second example of the method of reducing the amount of data in the second VC. In the example of FIG. 23, the item of the non-attribute information 213 of the first VC 211 is copied to a second VC 221c with the word "original" added to the head of the item name, to thereby form non-overlapping information 226. The signature 212 of the first VC 211 is also set in the second VC 221c as a signature 212a of the original first VC 211 after the word "original" is added to the head of the item name.

When reconstructing the first VC 211 from the second VC 221c, the non-overlapping information 226 in the second VC 221c is copied to the first VC 211 to be reconstructed. At this time, the word "original" is deleted from the item name of the item included in the non-overlapping information 226. In addition, the attribute information 224 in the second VC 221c is copied to the first VC 211 to be reconstructed. Further, the signature 212a of the first VC 211 included in the second VC 221c is copied to the first VC 211 to be reconstructed. At this time, the word "original" is deleted from the item name of the item included in the signature 212a of the first VC 211.

Thus, in the fifth embodiment, the attribute information 224, such as a name and face image, is copied only once to the second VC 221c without being changed on the GW 900, to thereby exclude overlapping items between the second VC 221a and the first VC 211. This results in a reduced amount of data in the second VC 221c managed in the second wallet 220 as well as a reduced amount of data communicated between the second wallet 220 and the verifier terminal 700. Note that addition of the word "original" to the head of the item name of each of the non-overlapping information 226 and the signature 212a of the first VC 211 prevents duplication of the item names in the second VC 221c, which facilitates reconstruction of the original first VC 211.

Next, the process of creating the second VC 221c with overlapping items removed therefrom is described in detail with reference to FIG. 24.

Figure 24:
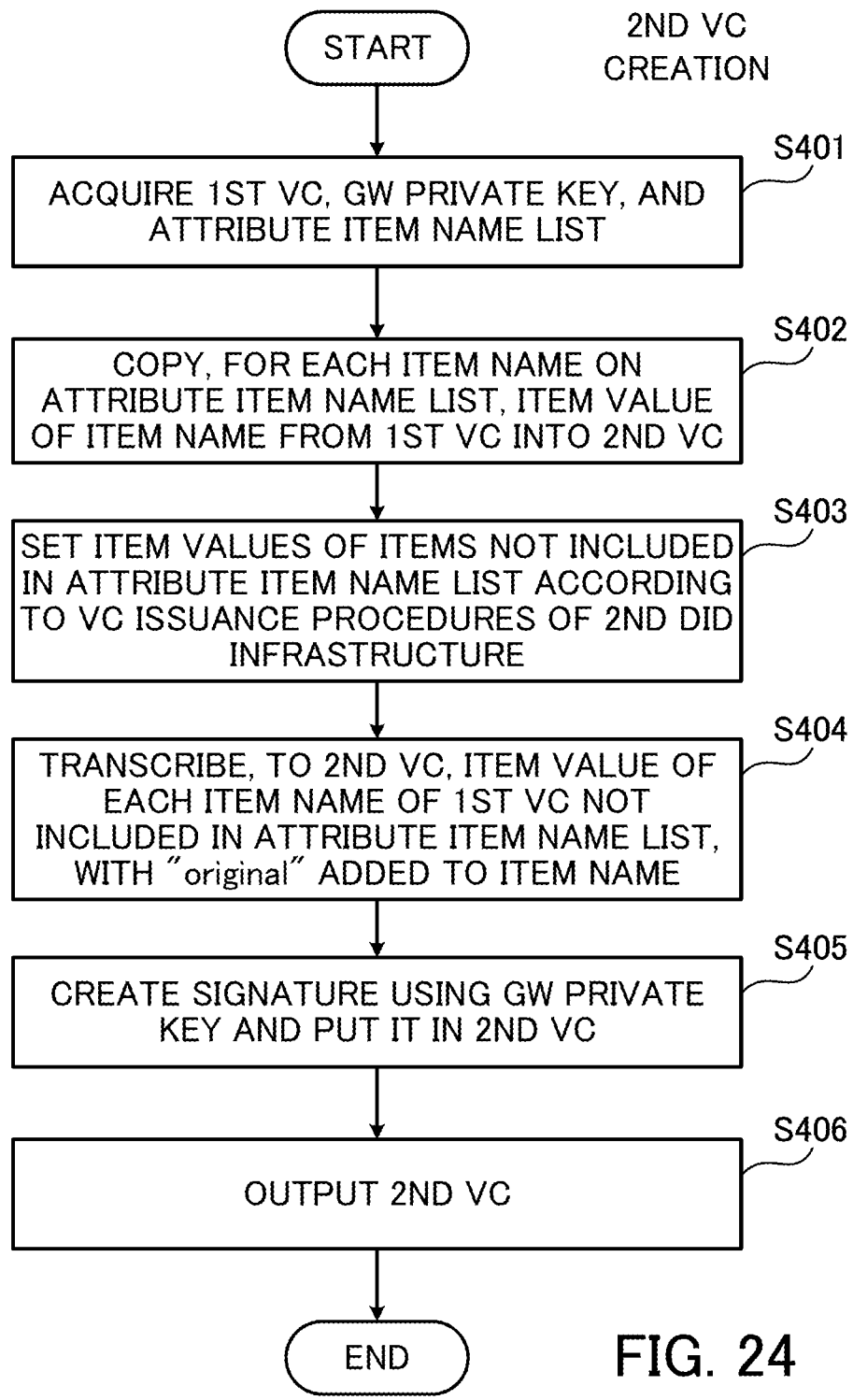
FIG. 24 is a flowchart illustrating an example of procedures of a second VC creating process according to a fifth embodiment.

FIG. 24 is a flowchart illustrating an example of procedures of a second VC creating process according to the fifth embodiment. The process in FIG. 24 is described below in the order of step numbers.

[Step S401] The second VC creating unit 930 acquires the first VC 211, the private key 901 of the GW 900, and the attribute item name list.

[Step S402] For each item name on the attribute item name list, the second VC creating unit 930 copies the item value of the item name from the first VC 211 into the second VC 221c.

[Step S403] The second VC creating unit 930 sets, in the second VC 221c, the item value of each item not included in the attribute item name list according to the VC issuance procedures defined for the second DID infrastructure 40.

[Step S404] The second VC creating unit 930 copies, amongst the items on the first VC 211, the item value of each item name not included in the attribute item name list to the second VC 221c. At this time, the word "original" is added to the head of the item name. Herewith, the non-overlapping information 226 and the signature 212a are added to the second VC 221c.

[Step S405] The second VC creating unit 930 creates the signature 222c for the attribute information 224, the non-overlapping information 226, and the signature 212a using the private key 901 of the GW 900 according to the signature creating procedures defined for the second DID infrastructure 40. The second VC creating unit 930 puts the created signature 222c in the second VC 221c.

[Step S406] The second VC creating unit 930 outputs the created second VC 221c. For example, the second VC creating unit 930 stores the second VC 221c in the second VC storing unit 940.

The second VC 221c with overlapping items removed therefrom is created in this manner.

FIG. 25 illustrates an example of the second VC with overlapping items removed therefrom. The second VC 221c includes, amongst the items of the first VC 211, copies of items whose item names are not on the attribute item name list. For each of these items, the word "original" is added to the head of the item name.

Next, the process of reconstructing the first VC 211 from the second VC 221c is described in detail with reference to FIG. 26.

Figure 26:
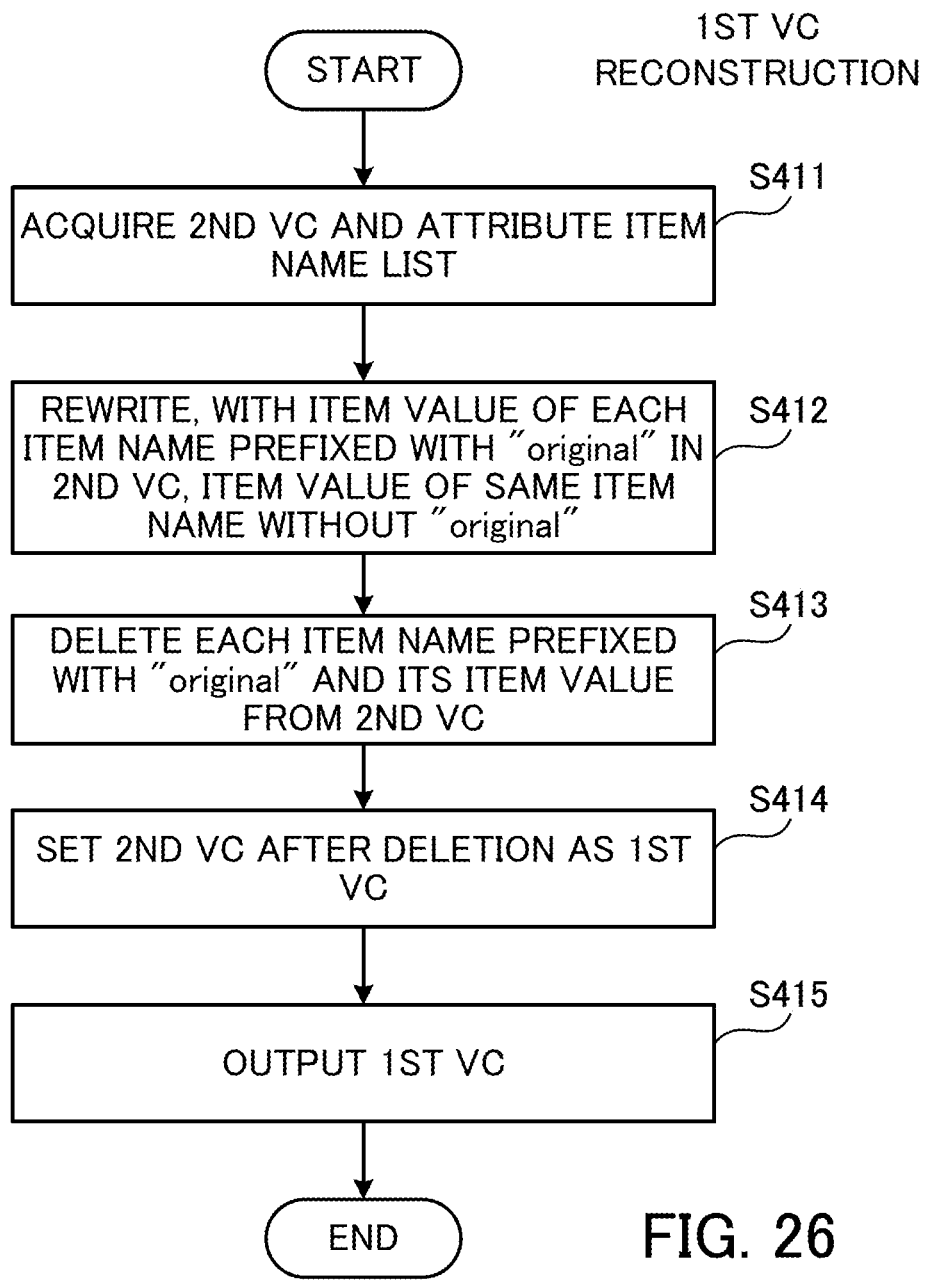
FIG. 26 is a flowchart illustrating an example of procedures of a first VC reconstructing process according to the fifth embodiment.

FIG. 26 is a flowchart illustrating an example of procedures of a first VC reconstructing process according to the fifth embodiment. The process in FIG. 26 is described below in the order of step numbers.

[Step S411] The first VC reconstructing unit 770 acquires the second VC 221c and the attribute item name list.

[Step S412] The first VC reconstructing unit 770 rewrites, with the item value of each item name prefixed with "original" in the second VC 221c, the item value of the same item name without "original". For example, the item value of the item name "DID" is rewritten with that of the item name "original DID".

[Step S413] The first VC reconstructing unit 770 deletes, from the second VC 221c, each item name prefixed with "original" and its corresponding item value.

[Step S414] The first VC reconstructing unit 770 sets the second VC 221c obtained after the deletion in step S413 as the reconstructed first VC 211.

[Step S415] The first VC reconstructing unit 770 outputs the reconstructed first VC 211.

Thus, the first VC 211 is reconstructed even from the second VC 221c with overlapping items removed therefrom.

(f) Sixth Embodiment

The sixth embodiment is directed to enabling transmission of a verification request in a way that is suited for each verifier when the verifier terminal 700 requests verification of the first VC 211 from verifiers in the first DID infrastructure 30. In that case, a method of sending a verification request is specified for each verifier, for example, in a verifier list.

FIG. 27 illustrates an example of a verifier list including verification request sending methods. In a verifier list 971a of FIG. 27, each DID for the second DID infrastructure 40 (i.e., each second DID infrastructure-dedicated DID), the sending method, and the destination are registered in association with the service name of a verifier who verifies VCs in the first DID infrastructure 30. Each field under the item "sending method" contains how to send a verification request. For example, when the verification request sending method is e-mail, "Mail" is entered. On the other hand, "Web" is entered when the verification request sending method is data upload via the Web. Each field under the item "destination" contains a destination of the verification request. When the sending method is "Mail", an e-mail address is entered. When the sending method is "Web", a uniform resource locator (URL) is entered.

With reference to the verifier list 971a, the verifier terminal 700 is able to send a verification request in a way that is suitable for each verifier.

Figure 28:
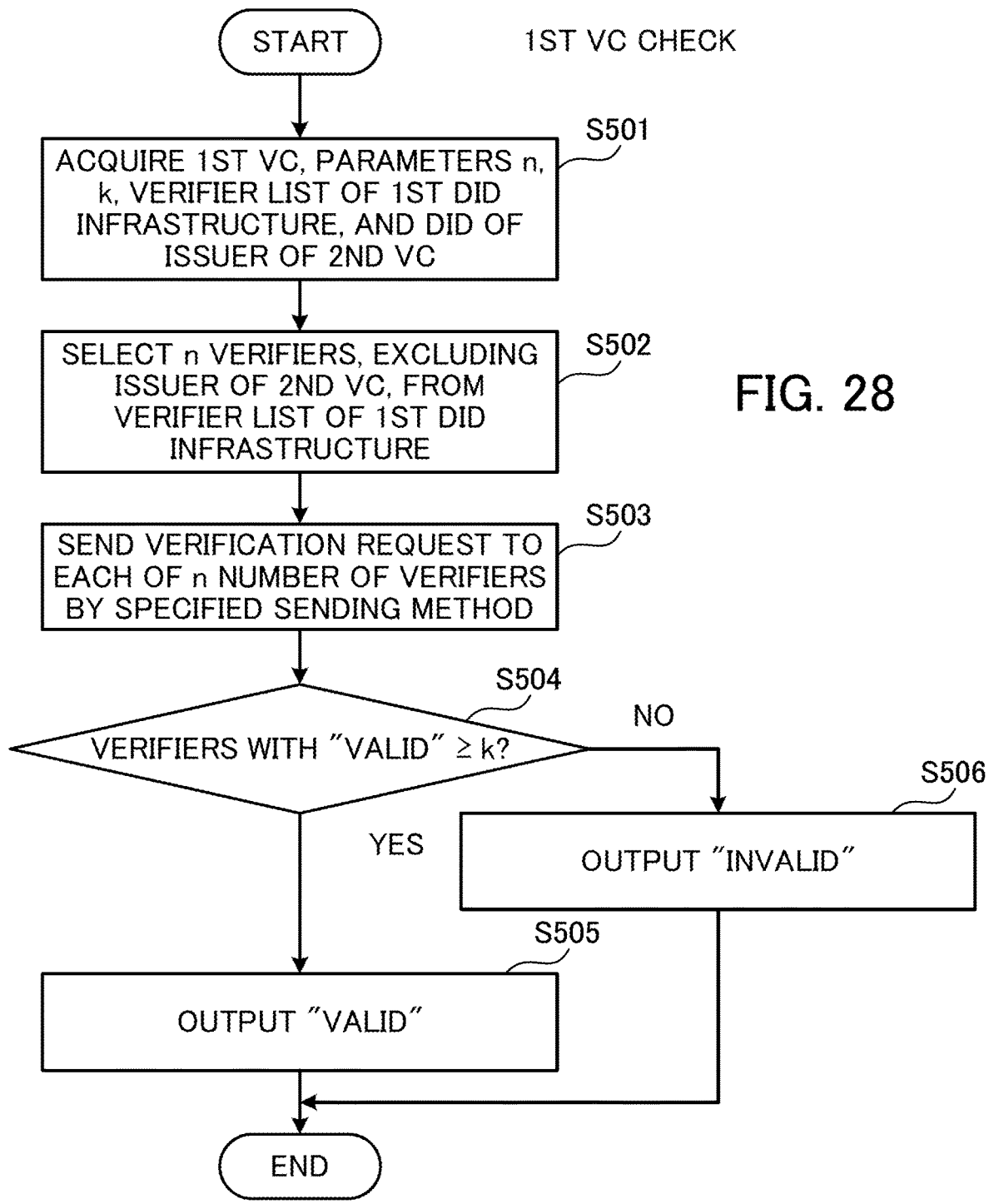
FIG. 28 is a flowchart illustrating an example of procedures of a first VC checking process when sending a verification request by a method specified for each request destination.

FIG. 28 is a flowchart illustrating an example of procedures of a first VC checking process when sending a verification request by a method specified for each request destination. Note that, amongst the process steps of FIG. 28, steps S501 and 502, and steps S504 to S506 are the same as steps S131 and S132, and steps S134 to S136, respectively, in the second embodiment depicted in FIG. 13. That is, the only difference from the second embodiment is Step S503, which is as follows.

[Step S503] The first VC checking unit 750 sends a verification request to each of the selected n number of verifiers by the corresponding sending method specified in the verifier list 971a.

Thus, a verification request is sent by a sending method specified in advance for each verifier.

(g) Another Embodiment

According to the second to sixth embodiments, the attribute information on VCs is recognized based on the attribute item name list; however, if it may be recognized in any other way, there is no need to use the attribute item name list. For example, if how to give each item name of attribute information is predetermined in a VC description format, items with item names complying with predetermined rules are determined as attribute information.

While, as described above, the embodiments have been exemplified, the configurations of individual portions illustrated in the embodiments may be replaced with others having the same functions. In addition, other constituent elements or processes may be added thereto. Furthermore, two or more compositions (features) of the embodiments may be combined together.

According to one aspect, it is possible to detect fraud committed in signature replacement.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:

acquiring a first verifiable credential (VC) that proves validity of attribute information of a holder by a first signature verifiable by verification procedures of a first decentralized identifiers (DID) infrastructure and a second VC that proves the validity of the attribute information of the holder by a second signature verifiable by verification procedures of a second DID infrastructure that has different signature and verification schemes from the first DID infrastructure;

verifying the second signature contained in the second VC by the verification procedures of the second DID infrastructure;

selecting, from a verifier list enumerating the plurality of verification devices, a predetermined number of verification devices capable of verifying the first signature contained in the first VC by the verification procedures of the first DID infrastructure;

transmitting a verification request for verifying the first signature contained in the first VC to the selected verification devices;

acquiring, from the selected verification devices, verification results of the first signature contained in the first VC;

determining that no fraud has taken place in the issuance procedures of the second VC responsive to acquiring, from a number of verification devices equal to or greater than a threshold, the verification results indicating that the attribute information has been verified to be valid by the first signature; and determining that there has been fraud in the issuance procedures of the second VC responsive to acquiring, from a number of verification devices less than the threshold, the verification results indicating that the attribute information has been verified to be valid by the first signature.

2. The non-transitory computer-readable recording medium according to claim 1, wherein:

the first VC is issued by an issuer device that manages the attribute information of the holder, and the second VC is issued, in response to a request for reissuance based on the first VC, by a re-signing device capable of verifying the first signature contained in the first VC by the verification procedures of the first DID infrastructure.

3. The non-transitory computer-readable recording medium according to claim 1, wherein:

the selecting of the predetermined number of verification devices includes excluding, from selection targets, a device having issued the second VC.

4. The non-transitory computer-readable recording medium according to claim 1, wherein:

information representing the first VC is included in the second VC, and the second signature contained in the second VC is information for proving the validity of the first VC and the attribute information, and the verifying of the second signature includes verifying the validity of the first VC and the attribute information by the second signature.

5. The non-transitory computer-readable recording medium according to claim 4, wherein:

in the second VC containing the information representing the first VC, duplication in the attribute information between the first VC and the second VC is removed, and in acquiring the first VC from the second VC, the first VC is reconstructed based on the second VC.

6. An information processing apparatus comprising:
a memory; and
a processor coupled to the memory and configured to execute a process including:
  acquiring a first verifiable credential (VC) that proves validity of attribute information of a holder by a first signature verifiable by verification procedures of a first decentralized identifiers (DID) infrastructure and a second VC that proves the validity of the attribute information of the holder by a second signature verifiable by verification procedures of a second DID infrastructure that has different signature and verification schemes from the first DID infrastructure;
  verifying the second signature contained in the second VC by the verification procedures of the second DID infrastructure;
  selecting, from a verifier list enumerating the plurality of verification devices, a predetermined number of verification devices capable of verifying the first signature contained in the first VC by the verification procedures of the first DID infrastructure;
  transmitting a verification request for verifying the first signature contained in the first VC to the selected verification devices;
  acquiring, from the verification device, verification results of the first signature contained in the first VC;
  determining that no fraud has taken place in the issuance procedures of the second VC responsive to acquiring, from a number of verification devices equal to or greater than a threshold, the verification results indicating that the attribute information has been verified to be valid by the first signature; and determining that there has been fraud in the issuance procedures of the second VC responsive to acquiring, from a number of verification devices less than the threshold, the verification results indicating that the attribute information has been verified to be valid by the first signature.

7. A verification method comprising:
issuing, by an issuer device managing attribute information of a holder, a first verifiable credential (VC) that proves validity of the attribute information of the holder by a first signature verifiable by verification procedures of a first decentralized identifiers (DID) infrastructure;

acquiring, by a holder terminal owned by the holder, the first VC and transmitting, to a re-signing device, a reissuance request for reissuing a VC based on the first VC;

issuing, by the re-signing device, in response to the reissuance request, a second VC that proves the validity of the attribute information of the holder by a second signature verifiable by verification procedures of a second DID infrastructure that has different signature and verification schemes from the first DID infrastructure;

acquiring, by the holder terminal, the second VC and transmitting the first VC and the second VC to a verifier terminal;

verifying, by the verifier terminal, the second signature contained in the second VC by the verification procedures of the second DID infrastructure;

transmitting, by the verifier terminal, a verification request for verifying the first signature contained in the first VC to a verification device;

verifying, by the verification device, the first signature contained in the first VC by the verification procedures of the first DID infrastructure; and acquiring, by the verifier terminal, verification results of the first signature contained in the first VC from the verification device.

8. The verification method according to claim 7, wherein:
the issuing of the second VC includes generating, by the re-signing device, the second VC that includes information representing the first VC and the second signature proving validity of the first VC and the attribute information, and the verifying of the second signature includes verifying, by the verifier terminal, the validity of the first VC and the attribute information by the second signature.

* * * * *